United States Patent
Tanabe

(10) Patent No.: US 8,639,301 B2
(45) Date of Patent: Jan. 28, 2014

(54) PORTABLE TELEPHONE, IMAGING SYSTEM EMPLOYING PORTABLE TELEPHONE AND IMAGING METHOD

(75) Inventor: Hideki Tanabe, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 191 days.

(21) Appl. No.: 12/849,358

(22) Filed: Aug. 3, 2010

(65) Prior Publication Data

US 2011/0105179 A1 May 5, 2011

(30) Foreign Application Priority Data

Aug. 3, 2009 (JP) ................................ 2009-180694

(51) Int. Cl.
*H04B 1/38* (2006.01)

(52) U.S. Cl.
USPC .................. 455/575.4; 455/550.1; 455/556.1

(58) Field of Classification Search
USPC .......... 348/207.9, 211.2, 207.2, 207.1, 211.1, 348/14.02, 220.1, 14.12; 455/556.1, 575.4, 455/3.06, 566, 550.1, 557, 552.1, 3.03
See application file for complete search history.

(56) References Cited

U.S. PATENT DOCUMENTS

| | | | | |
|---|---|---|---|---|
| 6,424,648 | B1 * | 7/2002 | Ng et al. | 370/352 |
| 2004/0032503 | A1 * | 2/2004 | Monden et al. | 348/207.99 |
| 2007/0178891 | A1 | 8/2007 | Louch et al. | |
| 2007/0188626 | A1 * | 8/2007 | Squilla et al. | 348/222.1 |
| 2007/0254640 | A1 | 11/2007 | Bliss | |
| 2007/0265033 | A1 * | 11/2007 | Brostrom | 455/557 |
| 2008/0200174 | A1 * | 8/2008 | Fry et al. | 455/445 |

FOREIGN PATENT DOCUMENTS

| | | |
|---|---|---|
| JP | 2003-18254 A | 1/2003 |
| JP | 2003-219043 A | 7/2003 |
| JP | 2004-214862 A | 7/2004 |
| JP | 2005-101867 A | 4/2005 |
| JP | 2005-323254 A | 11/2005 |
| JP | 2005-5813 A | 1/2006 |
| JP | 2007-195200 A | 8/2007 |

OTHER PUBLICATIONS

Extended European Search Report dated Sep. 24, 2013 (7 pages).

* cited by examiner

*Primary Examiner* — Lana N. Le
*Assistant Examiner* — Golam Sorowar
(74) *Attorney, Agent, or Firm* — Crowell & Moring LLP

(57) ABSTRACT

This portable telephone includes an imaging portion, a first communication portion for telephone communication and a control portion controlling the imaging portion to execute an imaging operation on the basis of a prescribed first operation of an operating-side portable telephone while establishing a telephone call state by making a telephone call to the operating-side portable telephone with the first communication portion so that the operating-side portable telephone takes the telephone call.

18 Claims, 9 Drawing Sheets

⟨CONTROL FLOW OF CAMERA-SIDE PORTABLE TELEPHONE⟩

PORTABLE TELEPHONE, IMAGING SYSTEM EMPLOYING PORTABLE TELEPHONE AND IMAGING METHOD

BACKGROUND OF THE INVENTION

1. Field of the Invention

The present invention relates to a portable telephone, an imaging system employing portable telephones and an imaging method, and more particularly, it relates to a portable telephone including an imaging portion, an imaging system employing portable telephones and an imaging method.

2. Description of the Background Art

A portable telephone including an imaging portion is known in general, as disclosed in each of Japanese Patent Laying-Open Nos. 2005-101867, 2005-323254 and 2003-219043, for example.

The aforementioned Japanese Patent Laying-Open No. 2005-101867 discloses a portable telephone (a camera-side portable telephone), having a camera function, capable of executing an imaging operation in response to an incoming signal from another portable telephone (an operating-side portable telephone) having a previously registered telephone number. This portable telephone is formed to establish a telephone call state by receiving a transmission signal (a call signal) from the operating-side portable telephone and to thereafter perform the imaging operation in the telephone call state on the basis of a prescribed operation from the operating-side portable telephone. The aforementioned "telephone call state" denotes a state where the portable telephones are connected with each other through a communication line so that the users of the portable telephones can talk to each other.

The aforementioned Japanese Patent Laying-Open No. 2005-323254 discloses a camera phone (a camera-side portable telephone) capable of executing an imaging operation in response to an incoming signal from a remote portable telephone (an operating-side portable telephone). This camera phone is formed to establish a telephone call state by receiving a transmission signal (a call signal) from the operating-side portable telephone and to thereafter perform the imaging operation in the telephone call state on the basis of a prescribed operation from the operating-side portable telephone.

The aforementioned Japanese Patent Laying-Open No. 2003-219043 discloses a folding camera phone, capable of executing an imaging operation on the basis of an operation from a remote operating terminal (a PC or another portable telephone). This folding camera phone (a camera-side portable telephone) is formed to perform the imaging operation in response to a control command such as an instruction for executing the imaging operation transmitted from the remote operating terminal accessing a common carrier server and received via the common carrier server. Further, the camera-side portable telephone is formed to transmit data of an acquired image to the operating terminal via the common carrier server. A system of transmitting/receiving a message including the control command or a message accompanied by the data of the acquired image is applied to communication between the folding camera phone and the operating terminal.

However, each of the camera phones described in the aforementioned Japanese Patent Laying-Open Nos. 2005-101867 and 2005-323254 is formed to perform the imaging operation in the telephone call state established by receiving the transmission signal (the call signal) from the operating-side portable telephone. Therefore, if some communication state (some telephone call state) has already been established between the camera-side portable telephone and a portable telephone other than the operating-side portable telephone or a wireline telephone, for example, communication (the telephone call state) between the camera-side portable telephone and the operating-side portable telephone whose user intends to instruct the camera-side portable telephone to perform the imaging operation can conceivably not be established. In other words, the telephone call state between the camera-side portable telephone and the operating-side portable telephone whose user intends to instruct the camera-side portable telephone to perform the imaging operation cannot be ensured until the communication state between the camera-side portable telephone and the portable telephone other than the operating-side portable telephone or the wireline telephone is cut off. Therefore, the user of the operating-side portable telephone cannot communicate with the camera-side portable telephone at desired timing, and hence the camera-side portable telephone cannot perform the imaging operation at timing desirable for the user.

The folding camera phone described in the aforementioned Japanese Patent Laying-Open No. 2003-219043 is formed to communicate with the operating terminal according to the communication system based on transmission/receiving of the message including the control command via the common carrier server. If the common carrier server causes a network delay or the like, therefore, immediacy of the control command from the operating terminal to the camera-side portable telephone is conceivably not implemented. In the communication system based on transmission/receiving of the message, further, a message or a telephone call from a third party different from the operating terminal may interruptively reach the camera-side portable telephone while the user of the operating terminal remote-controls the camera-side portable telephone from the operating terminal, and hence the remote control from the operating terminal is conceivably temporarily interrupted. Therefore, the user of the operating terminal cannot communicate with the camera-side portable telephone at desired timing, and hence the camera-side portable telephone cannot perform the imaging operation at timing desirable for the user.

SUMMARY OF THE INVENTION

The present invention has been proposed in order to solve the aforementioned problems, and an object of the present invention is to provide a portable telephone allowing a user to perform an imaging operation at desired timing, an imaging system employing portable telephones and an imaging method.

A portable telephone according to a first aspect of the present invention includes an imaging portion, a first communication portion for telephone communication and a control portion controlling the imaging portion to execute an imaging operation on the basis of a prescribed first operation of an operating-side portable telephone while establishing a telephone call state by making a telephone call to the operating-side portable telephone with the first communication portion so that the operating-side portable telephone takes the telephone call.

As hereinabove described, the portable telephone according to the first aspect of the present invention includes the control portion controlling the imaging portion to execute the imaging operation on the basis of the prescribed first operation of the operating-side portable telephone while establishing the telephone call state by making the telephone call to the operating-side portable telephone with the first communication portion so that the operating-side portable telephone takes the telephone call. When the user makes the imaging-side portable telephone execute the imaging operation, therefore, the imaging-side portable telephone makes the telephone call to the operating-side portable telephone as the originator to establish a communication state (the telephone call state), whereby the imaging-side portable telephone can be prevented from interruptive communication before establishing the telephone call state between the same and the operating-side portable telephone by making the telephone call, and the established telephone call state is not interrupted. Thus, the user can make the imaging portion execute the imaging operation while reliably occupying the imaging-side portable telephone without interruption after the telephone call therefrom, thereby performing the imaging operation at desired timing.

In the aforementioned portable telephone according to the first aspect, the control portion is preferably formed to control the first communication portion to make the telephone call to the operating-side portable telephone on the basis of an operation of a user. According to this structure, the control portion can easily control the first communication portion to make the telephone call for ensuring a telephone line necessary for the imaging operation on the basis of a prescribed operation of the user on the imaging-side portable telephone.

In this case, the portable telephone is preferably formed to be switchable between a first operation mode for ordinary telephone communication with the operating-side portable telephone and a second operation mode for allowing the imaging portion to execute the imaging operation on the basis of the prescribed first operation of the operating-side portable telephone, and the control portion is preferably formed to control the first communication portion to make the telephone call to the operating-side portable telephone when a user sets the portable telephone to the second operation mode. According to this structure, the imaging-side portable telephone is so triggered by an operation of the user switching the portable telephone from the first operation mode to the second operation mode that the same can reliably make the telephone call to the operating-side portable telephone.

In the aforementioned portable telephone according to the first aspect, the prescribed first operation of the operating-side portable telephone preferably includes an operation of a user cutting off a communication state in the telephone call state, and the control portion is preferably formed to control the imaging portion to execute the imaging operation on the basis of the operation of the user cutting off the telephone call state from the side of the operating-side portable telephone. According to this structure, the imaging-side portable telephone is so triggered by a general operation of the user "cutting off the telephone call state" from the side of the operating-side portable telephone that the same can easily execute the imaging operation.

In this case, the portable telephone is preferably formed to transmit a signal for terminating the communication state in the telephone call state when the user cuts off the communication state, and the control portion is preferably formed to control the imaging portion to execute the imaging operation by detecting that the user has cut off the communication state in the telephone call state when the first communication portion receives the signal for terminating the communication state. According to this structure, the imaging-side portable telephone receiving the "signal for terminating the communication state" recognizes the "signal for terminating the communication state" as an instruction for making the imaging portion execute the imaging operation after the operating-side portable telephone converts the operation of the user "cutting off the telephone call state" to the "signal for terminating the communication state", whereby the imaging portion can reliably execute the imaging operation through the communication between the portable telephones.

The aforementioned portable telephone according to the first aspect preferably further includes a second communication portion formed to be capable of communicating with the operating-side portable telephone by a method other than telephone communication and capable of acquiring identification information belonging to the operating-side portable telephone, and the control portion is preferably formed to control the first communication portion to make the telephone call to the operating-side portable telephone on the basis of the identification information previously acquired by the second communication portion when making the telephone call to the operating-side portable telephone. According to this structure, the imaging-side portable telephone can make the telephone call to (dial) the operating-side portable telephone on the basis of the identification information (the telephone number or the like) previously acquired by the second communication portion, whereby the user may not manually make the telephone call to the imaging-side portable telephone, and can be prevented from a burden.

In this case, the portable telephone is preferably formed to be switchable between a first operation mode for making telephone communication with the operating-side portable telephone and a second operation mode for allowing the imaging portion to execute the imaging operation on the basis of the prescribed first operation of the operating-side portable telephone, and the control portion is preferably formed to control the second communication portion to acquire the identification information of the operating-side portable telephone when the user sets the portable telephone to the second operation mode. According to this structure, the imaging-side portable telephone is so triggered by the operation of the user switching the portable telephone from the first operation mode to the second operation mode that the same can reliably acquire the identification information of the operating-side portable telephone.

In the aforementioned structure further including the second communication portion, the control portion is preferably formed to control the second communication portion to previously acquire the identification information belonging to the operating-side portable telephone by using at least one type of communication system, and the control portion is preferably formed to control the second communication portion to acquire the identification information by using a second communication system different from a first communication system when the identification information has been unacquirable through the first communication system. According to this structure, the control portion can retry to acquire the identification information of the operating-side portable telephone through the second communication system different from the first communication system when the identification information has been unacquirable through the first communication system. Thus, the control portion can more reliably acquire the identification information of the operating-side portable telephone.

The aforementioned portable telephone according to the first aspect is preferably so formed that a user can select or input identification information of the operating-side portable telephone, and the control portion is preferably formed to control the first communication portion to make the telephone call on the basis of the identification information selected or input by the user when making the telephone call to the operating-side portable telephone. According to this structure, the user can easily establish the telephone call state between the imaging-side portable telephone and the operating-side portable telephone by directly operating the imaging-side portable telephone and selecting or inputting the identification information of the operating-side portable telephone. Thus, the user can easily perform the imaging operation even if the operating-side portable telephone cannot communicate with the second communication portion of the imaging-side portable telephone.

In the aforementioned portable telephone according to the first aspect, the prescribed first operation of the operating-side portable telephone preferably includes an operation of a user transmitting at least either a first voice signal or a first tone signal from the operating-side portable telephone, and the control portion is preferably formed to control the imaging portion to execute the imaging operation on the basis of at least either the first voice signal or the first tone signal from the operating-side portable telephone while establishing the telephone call state between the portable telephone and the operating-side portable telephone. According to this structure, the imaging-side portable telephone is so triggered by the first voice signal or the first tone signal that the same can easily execute the imaging operation when the user gives a prescribed watchword as the first voice signal or transmits the first tone signal by operating the operating-side portable telephone, for example.

In this case, the portable telephone preferably further includes a storage portion storing at least either the first voice signal or the first tone signal, and the control portion is preferably formed to control the imaging portion to execute the imaging portion when at least a voice signal or a tone signal from the operating-side portable telephone coincides with at least either the first voice signal or the first tone signal stored in the storage portion. According to this structure, the control portion can control the imaging portion to execute the imaging operation after easily distinguishing the first voice signal or the first tone signal for making the imaging portion execute the imaging operation by simply comparing the first voice signal or the first tone signal stored in the storage portion with the voice signal or the tone signal received from the operating-side portable telephone.

In the aforementioned structure in which the prescribed first operation includes the operation of transmitting the first voice signal from the operating-side portable telephone, the first voice signal is preferably a signal related to a prescribed voice pattern or a prescribed volume. According to this structure, the user can easily make the imaging portion execute the imaging operation by making some sound with a prescribed volume, for example. Alternatively, the user can make the imaging portion execute the imaging operation by giving a prescribed voice pattern such as a watchword at timing for executing the imaging operation.

In the aforementioned portable telephone according to the first aspect, the control portion is preferably formed to control the imaging portion to acquire a preview image before executing the imaging operation on the basis of a second operation, different from the prescribed first operation, from the operating-side portable telephone and to transmit the acquired preview image to the operating-side portable telephone. According to this structure, the operating-side portable telephone can obtain the preview image acquired according to the second operation before the imaging portion executes the imaging operation, whereby the user can properly adjust the position or the angle of the imaging-side portable telephone or the object while confirming the preview image.

In this case, the control portion is preferably formed to transmit the preview image acquired on the basis of the second operation to the operating-side portable telephone through the first communication portion performing telephone communication. According to this structure, the control portion can quickly transmit the preview image to the operating-side portable telephone through a telephone line. In other words, the imaging-side portable telephone can transmit preview image data to the operating-side portable telephone with immediacy, dissimilarly to a case of transmitting data of the preview image through a network line via an Internet server, for example, other than the telephone line. Therefore, the user can perform the imaging operation at desired timing while quickly confirming the preview image.

In the aforementioned structure having the control portion transmitting the preview image to the operating-side portable telephone through the first communication portion, the control portion is preferably formed to maintain the telephone call state between the portable telephone and the operating-side portable telephone after transmitting the preview image to the operating-side portable telephone. According to this structure, the portable telephone maintains the telephone call state between the same and the operating-side portable telephone after transmitting the preview image through the telephone line, whereby the user can reperform the second operation so that the control portion retransmits the preview image to the operating-side portable telephone. Further, the portable telephone so maintains the telephone call state between the same and the operating-side portable telephone after transmitting the preview image that the user can perform the prescribed first operation (the imaging operation) at desired timing.

In the aforementioned structure having the control portion controlling the imaging portion to acquire the preview image before executing the imaging operation on the basis of the second operation from the operating-side portable telephone, the control portion is preferably formed to control the imaging portion to acquire the preview image with a number of pixels smaller than a number of pixels for executing the imaging operation on the basis of the prescribed first operation when acquiring the preview image on the basis of the second operation and to transmit data of the acquired preview image to the operating-side portable telephone in a compressed state. According to this structure, the quantity of data transmission of the preview image can be reduced, whereby the time required for the data transmission can also be reduced. Thus, the user can more quickly confirm the preview image.

In the aforementioned structure having the control portion controlling the imaging portion to acquire the preview image before executing the imaging operation on the basis of the second operation from the operating-side portable telephone, the control portion is preferably formed to receive information related to an imaging range specified by a user in the preview image from the operating-side portable telephone and to set an imaging range for executing the imaging operation on the basis of the prescribed first operation on the basis of the information related to the imaging range. According to this structure, the user can transmit information related to a selected imaging range to the imaging-side portable telephone after selecting the imaging range by observing the preview image, whereby the imaging portion can acquire an image in the imaging range desired by the user when executing the imaging operation on the basis of the prescribed first operation.

In the aforementioned structure having the control portion controlling the imaging portion to acquire the preview image on the basis of the second operation from the operating-side portable telephone before executing the imaging operation, the prescribed first operation of the operating-side portable telephone preferably includes an operation of a user transmitting at least either a first voice signal or a first tone signal from the operating-side portable telephone, the second operation of the operating-side portable telephone preferably includes an operation of a user transmitting at least either a second voice signal different from a first voice signal or a second tone signal different from a first tone signal from the operating-side portable telephone, and the control portion is formed to control the imaging portion to acquire the preview image before executing the imaging operation on the basis of at least either the second voice signal or the second tone signal from the operating-side portable telephone and to transmit the acquired preview image to the operating-side portable telephone. According to this structure, the operating-side portable telephone can easily obtain the preview image with at least the second voice signal different from the first voice signal or the second tone signal different from the first tone signal.

An imaging system employing portable telephones according to a second aspect of the present invention includes an operating-side portable telephone and an imaging-side portable telephone including an imaging portion, a communication portion for telephone communication and a control portion controlling the imaging portion to execute an imaging operation on the basis of a prescribed operation of the operating-side portable telephone while establishing a telephone call state by making a telephone call to the operating-side portable telephone with the communication portion so that the operating-side portable telephone takes the telephone call.

As hereinabove described, the imaging system employing portable telephones according to the second aspect of the present invention includes the operating-side portable telephone and the imaging-side portable telephone including the control portion controlling the imaging portion to execute the imaging operation on the basis of the prescribed operation of the operating-side portable telephone while establishing the telephone call state by making the telephone call to the operating-side portable telephone with the communication portion so that the operating-side portable telephone takes the telephone call. When the user makes the imaging-side portable telephone execute the imaging operation, therefore, the imaging-side portable telephone makes the telephone call to the operating-side portable telephone as the originator to establish a communication state (the telephone call state), whereby the imaging-side portable telephone can be prevented from interruptive communication before establishing the telephone call state between the same and the operating-side portable telephone by making the telephone call, and the established telephone call state is not interrupted. Thus, the user can make the imaging portion execute the imaging operation while reliably occupying the imaging-side portable telephone without interruption after the telephone call therefrom, thereby performing the imaging operation at desired timing.

An imaging method employing portable telephones according to a third aspect of the present invention includes the steps of establishing a telephone call state by making a telephone call from an imaging-side portable telephone including a communication portion for telephone communication and an imaging portion to an operating-side portable telephone so that the operating-side portable telephone takes the telephone call and executing an imaging operation of the imaging portion on the basis of a prescribed operation of a user on the operating-side portable telephone in the state where the telephone call state is established between the imaging-side portable telephone and the operating-side portable telephone.

As hereinabove described, the imaging method employing portable telephones according to the third aspect of the present invention includes the steps of establishing the telephone call state by making the telephone call from the imaging-side portable telephone including the imaging portion to the operating-side portable telephone so that the operating-side portable telephone takes the telephone call and executing the imaging operation of the imaging portion on the basis of the prescribed operation of the user on the operating-side portable telephone in the state where the telephone call state is established between the imaging-side portable telephone and the operating-side portable telephone. When the user makes the imaging-side portable telephone execute the imaging operation, therefore, the imaging-side portable telephone makes the telephone call to the operating-side portable telephone as the originator to establish a communication state (the telephone call state), whereby the imaging-side portable telephone can be prevented from interruptive communication before establishing the telephone call state between the same and the operating-side portable telephone by making the telephone call, and the established telephone call state is not interrupted. Thus, the user can make the imaging portion execute the imaging operation while reliably occupying the imaging-side portable telephone without interruption after the telephone call therefrom, thereby performing the imaging operation at desired timing.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
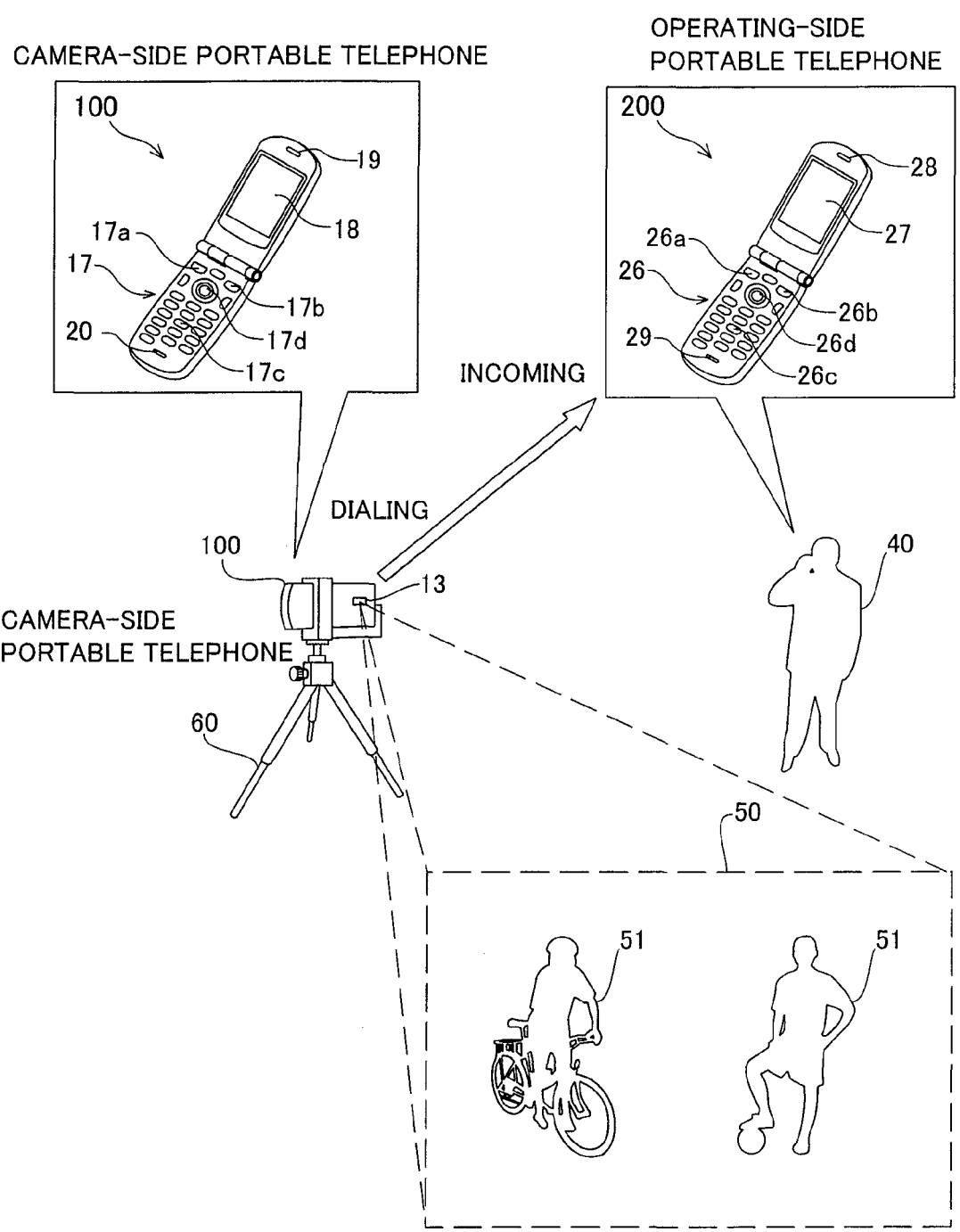
FIG. 1 illustrates the overall structure of an imaging system employing a camera-side portable telephone according to a first embodiment of the present invention.

Embodiments of the present invention are now described with reference to the drawings.

(First Embodiment)

First, the structure of an imaging system consisting of a camera-side portable telephone 100 and an operating-side portable telephone 200 according to a first embodiment of the present invention is described with reference to FIGS. 1 to 4. The camera-side portable telephone 100 is an example of the "portable telephone" or the "imaging-side portable telephone" in the present invention.

The imaging system employing the portable telephones 100 and 200 according to the first embodiment of the present invention is constituted of the camera-side portable telephone 100 formed to be settable on a tripod 60 for acquiring an image of objects 51 in an imaging range 50 and the operating-side portable telephone 200 capable of remote-controlling the camera-side portable telephone 100. In the imaging system according to the first embodiment, the operating-side portable telephone 200 performing remote control in a "remote imaging mode" described later is previously registered in the camera-side portable telephone 100 as the "operating-side portable telephone". An operation mode of the camera-side portable telephone 100 for making ordinary telephone communication with another portable telephone corresponds to the "first operation mode" in the present invention, and the aforementioned "remote imaging mode" is an example of the "second operation mode" in the present invention.

Figure 2:
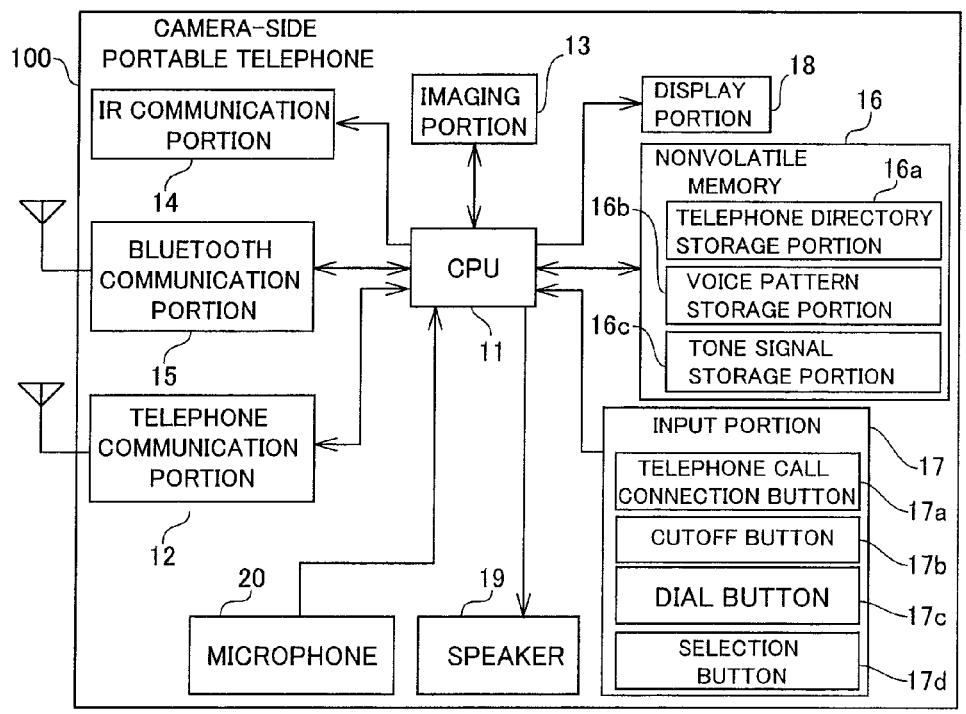
FIG. 2 is a block diagram for illustrating the camera-side portable telephone according to the first embodiment of the present invention.

As shown in FIG. 2, the camera-side portable telephone 100 is a portable telephone, having an imaging function (camera function), including a CPU 11, a telephone communication portion 12, an imaging portion 13 performing an imaging operation, an IR (infrared) communication portion 14, a Bluetooth (registered trademark) communication portion 15, a nonvolatile memory 16, an input portion 17, a display portion 18, a speaker 19 and a microphone 20. The CPU 11 is an example of the "control portion" in the present invention, and the telephone communication portion 12 is an example of the "first communication portion" in the present invention. The IR (infrared) communication portion 14 and the Bluetooth communication portion 15 are examples of the "second communication portion" in the present invention respectively.

The CPU 11 has a function of controlling the camera-side portable telephone 100. The telephone communication portion 12 is formed to be capable of transmitting/receiving radio waves to/from a base station (not shown) of a portable telephone company and to be capable of making radiotelephone communication, data communication and videophone communication with another outside line telephone such as the operating-side portable telephone 200 (see FIG. 1) through the base station.

The IR communication portion 14 and the Bluetooth communication portion 15 are formed to be capable of transmitting/receiving data to/from an external apparatus such as the operating-side portable telephone 200 (see FIGS. 1 and 3) through radio communication different from the radiotelephone communication respectively. More specifically, the IR communication portion 14 is formed to transmit/receive data to/from the external apparatus by infrared communication, while the Bluetooth communication portion 15 is formed to transmit/receive data to/from the external apparatus while performing near field communication according to the Bluetooth standard. Thus, the camera-side portable telephone 100 is formed to obtain the telephone number and the mail address of the operating-side portable telephone 200 and to transmit the telephone number and the mail address of the camera-side portable telephone 100 itself to the external apparatus through the IR communication portion 14 or the Bluetooth communication portion 15. The infrared communication and the near field communication according to the Bluetooth standard are examples of the "communication system" in the present invention. The telephone numbers and the mail addresses are examples of the "identification information" in the present invention.

The nonvolatile memory 16 has a function of storing various data such as the telephone number of the camera-side portable telephone 100 itself, the telephone number of another portable telephone such as the operating-side portable telephone 200, control programs of the CPU 11 and images acquired by the imaging portion 13.

The input portion 17 is constituted of a plurality of buttons such as a telephone call connection button 17a pressed down for taking a telephone call and establishing a telephone call state, a cutoff button 17b pressed down for terminating the telephone call, dial buttons 17c (buttons "0" to "9", "*" and "#") for dialing telephone numbers and a selection button 17d. A user 40 presses down the selection button 17d in order to perform various operations on an operation screen displayed on the display portion 18. For example, the camera-side portable telephone 100 is so formed that user 40 can switch the camera-side portable telephone 100 (the CPU 11) to the "remote imaging mode" described later by performing a prescribed operation on the selection button 17d. Further, the camera-side portable telephone 100 is so formed that the user 40 can select identification information of the operating-side portable telephone 200 employed for remote imaging from a plurality of identification data (telephone numbers etc.) registered in a telephone directory storage portion 16a stored in the nonvolatile memory 16 with the selection button 17d.

The display portion 18 has a function of displaying the operation screen for allowing the user 40 to operate the camera-side portable telephone 100 and an image acquired by the imaging portion 13. The speaker 19 has a function of outputting a voice received through the telephone communication portion 12 or input from the CPU 11. The microphone 20 has a function of converting the voice to an electric signal and outputting the same to the CPU 11 etc.

Figure 3:
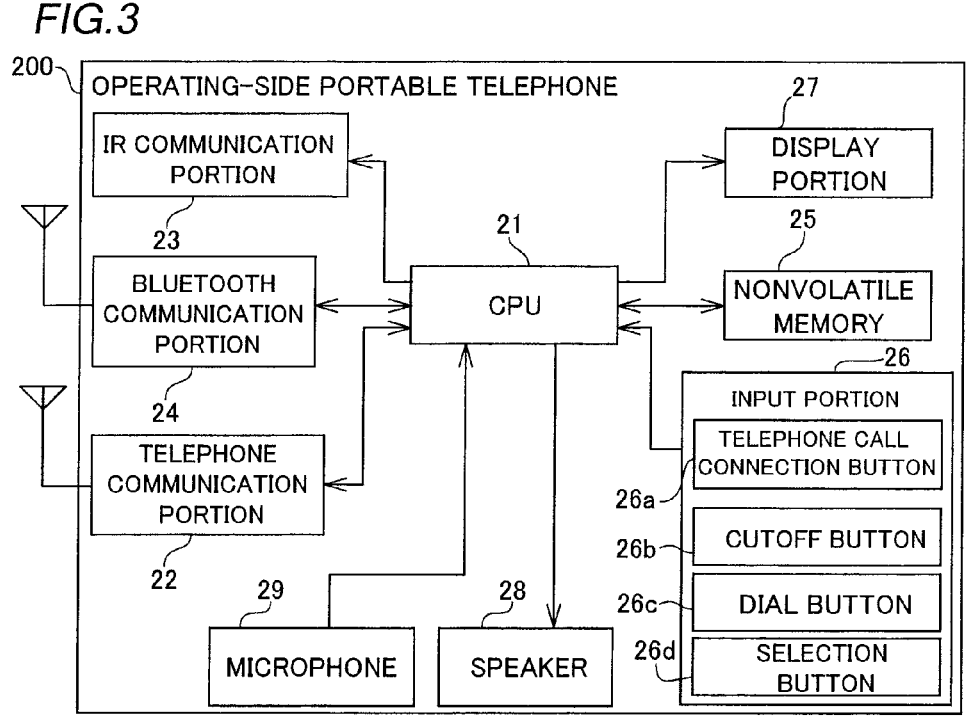
FIG. 3 is a block diagram for illustrating an operating-side portable telephone shown in FIG. 1.

The operating-side portable telephone 200 is substantially similar in structure to the aforementioned camera-side portable telephone 100. More specifically, the operating-side portable telephone 200 includes a CPU 21, a telephone communication portion 22, an IR (infrared) communication portion 23, a Bluetooth communication portion 24, a nonvolatile memory 25, an input portion 26, a display portion 27, a speaker 28 and a microphone 29, as shown in FIG. 3.

The CPU 21 has a function of controlling the operating-side portable telephone 200. The CPU 21 also has a function of transmitting a voice signal or the like received from the microphone 29 to the camera-side portable telephone 100 through the telephone communication portion 22 while establishing a telephone call to the camera-side portable telephone 100. The telephone communication portion 22 is formed to be capable of transmitting/receiving radio waves to/from the base station (not shown) of the portable telephone company and to be capable of performing telephone communication, data communication and videophone communication with another outside line telephone such as the camera-side portable telephone 100 (see FIG. 2) through the base station.

The IR communication portion 23 and the Bluetooth communication portion 24 are capable of transmitting/receiving data to/from an external apparatus such as the camera-side portable telephone 100 through radio communication (infrared communication and near field communication according to the Bluetooth standard) respectively. In other words, the IR communication portion 23 and the Bluetooth communication portion 24 have functions of receiving the telephone number and the mail address of the camera-side portable telephone 100 and transmitting the telephone number and the mail address of the operating-side portable telephone 200 to the connected external apparatus (the camera-side portable telephone 100 or the like).

The Bluetooth communication portion 24 is so formed that a pairing passkey can be previously set to allow data communication with the Bluetooth communication portion 15 of the camera-side portable telephone 100. When the pairing passkey is previously set with respect to the Bluetooth communication portions 15 and 24, therefore, the operating-side portable telephone 200 can transmit identification information such as the telephone number and the mail address thereof to the camera-side portable telephone 100.

The nonvolatile memory 25 has a function of storing various data such as the telephone number and the mail address of the operating-side portable telephone 200 itself, the telephone number of another portable telephone such as the camera-side portable telephone 100 and control programs of the CPU 21.

The input portion 26 is constituted of a telephone call connection button 26a, a cutoff button 26b, dial buttons 26c (buttons "0" to "9", "*" and "#") and a selection button 26d. The dial buttons 26c, pressed down for dialing telephone numbers, are so formed that the operating-side portable telephone 200 transmits a tone signal generated in response to each dial button 26c pressed down by the user 40 to the camera-side portable telephone 100. The user 40 presses down the selection button 26d in order to perform various operations (such as selection of an operation item) on an operation screen displayed on the display portion 27. The user 40 can perform an operation of starting the IR communication portion 23 (an infrared communication function) or the Bluetooth communication portion 24 (a Bluetooth communication function) in order to transmit the identification information (the telephone number) of the operating-side portable telephone 200 to the camera-side portable telephone 100 with the selection button 26d.

The display portion 27 has a function of displaying the operation screen allowing the user 40 to operate the operating-side portable telephone 200. The speaker 28 has a function of outputting a voice received through the telephone communication portion 22 or input from the CPU 21. The microphone 29 has a function of converting the voice to an electric signal and outputting the same to the CPU 21 etc.

According to the first embodiment, the CPU 11 (see FIG. 2) of the camera-side portable telephone 100 is formed to make a telephone call to the operating-side portable telephone 200 belonging to the user 40 at prescribed timing when the user 40 sets the camera-side portable telephone 100 to the "remote imaging mode", as shown in FIG. 1. When the user 40 presses down the cutoff button 26b of the operating-side portable telephone 200, for example, while the operating-side portable telephone 200 takes the telephone call to establish a telephone call state between the same and the camera-side portable telephone 100, the CPU 11 (see FIG. 2) of the camera-side portable telephone 100 controls the imaging portion 13 to release the shutter on the basis of the operation of the user 40 pressing down the cutoff button 26b. The operation of the user 40 setting the camera-side portable telephone 100 to the "remote imaging mode" is an example of the "operation of a user" in the present invention. The operation of the user 40 pressing down the cutoff button 26b is an example of the "prescribed first operation" or the "prescribed operation" in the present invention.

According to the first embodiment, as hereinabove described, the camera-side portable telephone 100 is so formed that the CPU 11 is triggered by the operation of the user 40 "pressing down the cutoff button 26b" of the operating-side portable telephone 200 to control the imaging portion 13 to execute the imaging operation (the operation of releasing the shutter).

A control flow of the imaging operation of the camera-side portable telephone 100 in the "remote imaging mode" according to the first embodiment of the present invention is now described with reference to FIGS. 1 to 5.

Figure 4:
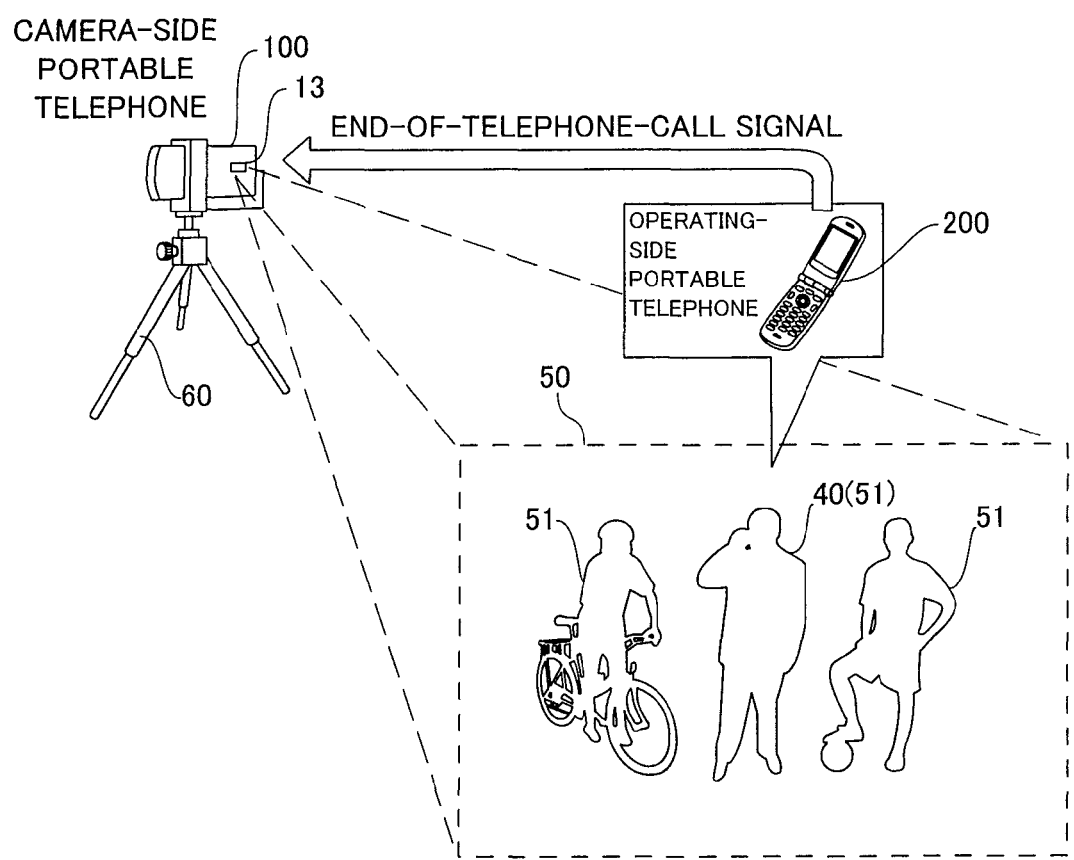
FIG. 4 is a diagram for illustrating an imaging operation of the camera-side portable telephone according to the first embodiment of the present invention.

First, an outline of the imaging operation of the camera-side portable telephone 100 in the "remote imaging mode" according to the first embodiment is described. When the user 40 sets the camera-side portable telephone 100 to the "remote imaging mode", the camera-side portable telephone 100 makes a telephone call to the operating-side portable telephone 200, as shown in FIG. 1. Thereafter the user 40 establishes the telephone call in the operating-side portable telephone 200 on the basis of an incoming signal from the camera-side portable telephone 100. In this state, the user 40 moves into the imaging range 50 for the camera-side portable telephone 100 as shown in FIG. 4 and thereafter presses down the cutoff button 26b (see FIG. 3) of the operating-side portable telephone 200 at prescribed timing, so that the imaging portion 13 of the camera-side portable telephone 100 executes the imaging operation.

The details of the control flow of the imaging operation of the camera-side portable telephone 100 in the "remote imaging mode" are now described.

Figure 5:
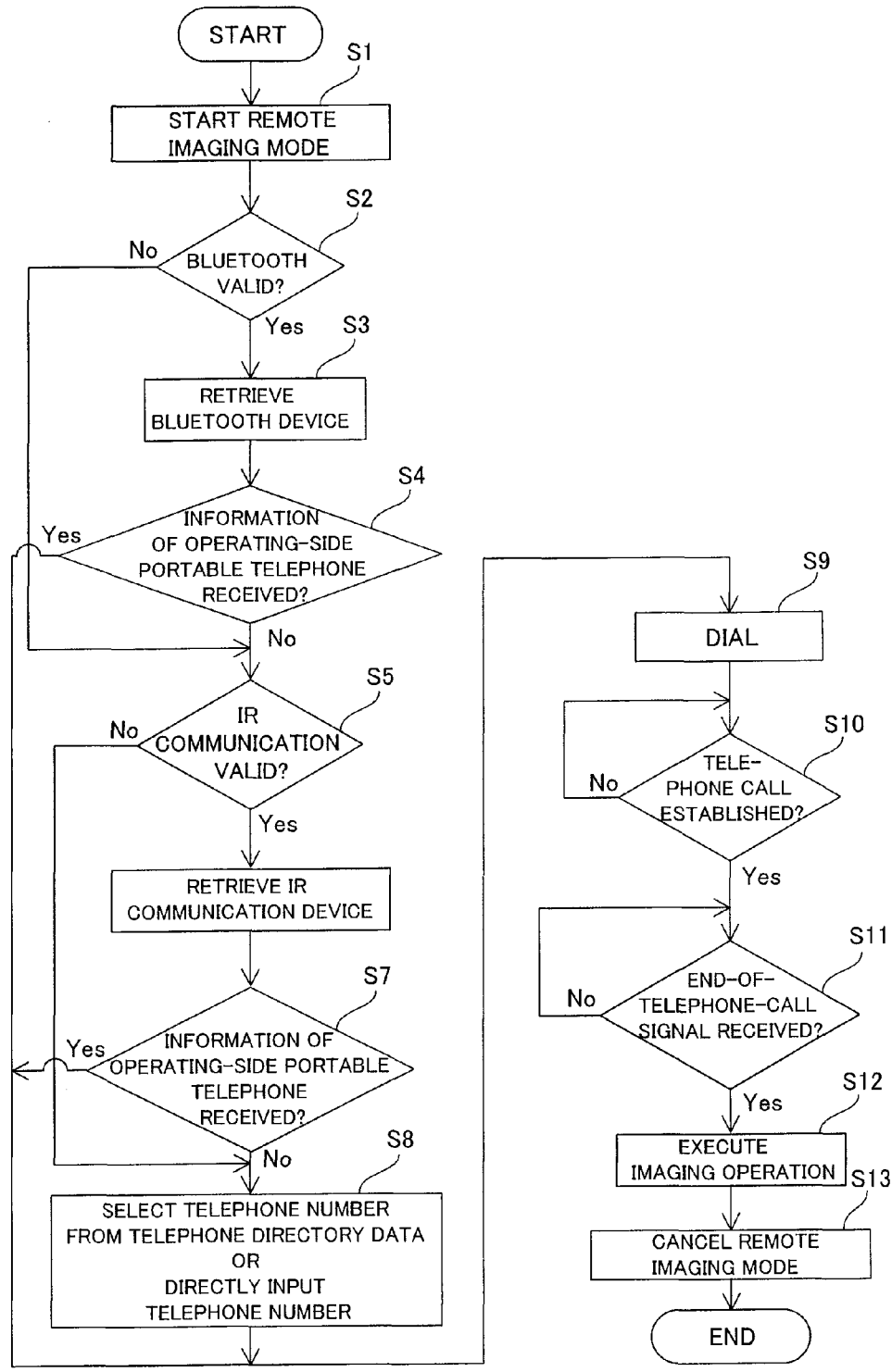
FIG. 5 is a control flow chart for illustrating the imaging operation of the camera-side portable telephone according to the first embodiment of the present invention.

As shown in FIG. 5, the user 40 switches the camera-side portable telephone 100 to the "remote imaging mode" by operating the selection button 17d (see FIG. 1) at a step S1. Thus, the CPU 11 (see FIG. 2) starts the "remote imaging mode".

Then, the CPU 11 specifies the communicatee (the operating-side portable telephone 200 (see FIG. 1)) at steps S2 to S8. At the step S2, the CPU 11 determines whether or not the Bluetooth communication portion 15 is valid. If the Bluetooth function is invalid, the CPU 11 advances to the step S5. If the Bluetooth function is valid, on the other hand, the CPU 11 advances to the step S3, and retrieves a Bluetooth device (the operating-side portable telephone 200) present within the communication range of the camera-side portable telephone 100. More specifically, the CPU 11 retrieves the presence of the operating-side portable telephone 200 having the Bluetooth communication portion 24 (see FIG. 3) in which the same pairing passkey as the Bluetooth communication portion 15 is set when the pairing passkey is previously set in the Bluetooth communication portion 15. If the operating-side portable telephone 200 is present within the communicable range of the camera-side portable telephone 100, the CPU 11 recognizes the operating-side portable telephone 200 as a connectable device, and receives the identification information such as the telephone number and the mail address of the operating-side portable telephone 200 through the Bluetooth communication portion 24 of the operating-side portable telephone 200. If the operating-side portable telephone 200 is not present within the communication range of the camera-side portable telephone 100 or the pairing passkey is not set in the Bluetooth communication portion 24 of the operating-side portable telephone 200, on the other hand, the CPU 11 does not receive the identification information such as the telephone number and the mail address of the operating-side portable telephone 200. The near field communication between the Bluetooth communication portions 15 and 24 in this control flow is an example of the "first communication system" in the present invention.

At the step S4, the CPU 11 determines whether or not the identification information such as the telephone number and the mail address of the operating-side portable telephone 200 has been received through the Bluetooth communication portion 15. If the identification information of the operating-side portable telephone 200 has been received, the CPU 11 advances to the step S9. If the identification information of the operating-side portable telephone 200 has not been received, on the other hand, the CPU 11 advances to the step S5.

At the step S5, the CPU 11 determines whether or not the IR communication portion 14 is valid. If the IR communication function is invalid, the CPU 11 advances to the step S8. If the IR communication function is valid, on the other hand, the CPU 11 advances to the step S6, and retrieves an IR communication device (the operating-side portable telephone 200) present within the communication range of the camera-side portable telephone 100. More specifically, the IR communication portion 14 of the camera-side portable telephone 100 transmits a data request when the user 40 starts the IR communication portion 23 (see FIG. 3) of the operating-side portable telephone 200 so that the identification information (telephone number) of the operating-side portable telephone 200 is transmittable. If the operating-side portable telephone 200 is present within the communicable range of the camera-side portable telephone 100, the CPU 11 receives the identification information such as the telephone number and the mail address of the operating-side portable telephone 200 through the IR communication portion 23 of the operating-side portable telephone 200. If the operating-side portable telephone 200 is not present within the communicable range of the camera-side portable telephone 100 or the IR communication function of the operating-side portable telephone 200 is invalid, on the other hand, the CPU 11 does not receive the identification information of the operating-side portable telephone 200. The IR communication (infrared communication) between the IR communication portions 14 and 23 in this control flow is an example of the "second communication system" in the present invention.

At the step S7, the CPU 11 determines whether or not the identification information such as the telephone number and the mail address of the operating-side portable telephone 200 has been received through the IR communication portion 14. In other words, the CPU 11 determines whether or not the IR communication portion 23 of the operating-side portable telephone 200 has transmitted the identification information such as the telephone number and the mail address of the operating-side portable telephone 200 to the IR communication portion 14 of the camera-side portable telephone 100 in response to the data request received from the IR communication portion 14 of the camera-side portable telephone 100. If the identification information of the operating-side portable telephone 200 has been received through the IR communication portion 14, the CPU 11 advances to the step S9. If the identification information of the operating-side portable telephone 200 has not been received through the IR communication portion 14, on the other hand, the CPU 11 advances to the step S8.

At the step S8, the user 40 selects the telephone number of the operating-side portable telephone 200 by retrieving data (telephone directory data) stored in the nonvolatile memory 16 of the camera-side portable telephone 100 through the input portion 17. After specifying the identification information of the operating-side portable telephone 200 in this manner, the CPU 11 advances to the step S9.

According to the first embodiment, the CPU 11 of the camera-side portable telephone 100 dials (makes a telephone call to) the operating-side portable telephone 200 at the step S9. At a step S10, the CPU 11 determines whether or not the telephone call to the operating-side portable telephone 200 has been established. When the user 40 presses down the telephone call connection button 26a (see FIG. 3) of the operating-side portable telephone 200 on the basis of the incoming signal from the camera-side portable telephone 100, the telephone call from the camera-side portable telephone 100 to the operating-side portable telephone 200 is established.

If determining that the telephone call to the operating-side portable telephone 200 has been established at the step S10, the CPU 11 advances to a step S11 and determines whether or not the established telephone call state has been cut off. In other words, the CPU 11 determines whether or not an "end-of-telephone-call signal" indicating that the user 40 has pressed down the cutoff button 26b (see FIG. 3) has been received from the operating-side portable telephone 200. If the "end-of-telephone-call signal" indicating that the user 40 has pressed down the cutoff button 26b is not received, the CPU 11 repeats the determination at the step S11, thereby continuing the telephone call state. The end-of-telephone-call signal is an example of the "signal for terminating a communication state" in the present invention.

If determining that the signal (the end-of-telephone call signal) indicating that the user 40 has pressed down the cutoff button 26b has been received at the step S11, the CPU 11 is triggered by the received "end-of-telephone-call signal", to control the imaging portion 13 to execute the imaging operation at a step S12. Thus, the nonvolatile memory 16 (see FIG. 1) preserves image data of the objects 51 (see FIG. 4). After the imaging operation, the CPU 11 cuts off the telephone call to the operating-side portable telephone 200 on the basis of the received "end-of-telephone-call signal".

Thereafter the CPU 11 cancels the "remote imaging mode" at a step S13. Thus, the control flow of the imaging operation in the "remote imaging mode" of the camera-side portable telephone 100 according to the first embodiment is terminated.

According to the first embodiment, as hereinabove described, the camera-side portable telephone 100 includes the CPU 11 controlling the imaging portion 13 to execute the imaging operation on the basis of the prescribed operation (the operation of cutting off the telephone call state) of the user 40 on the operating-side portable telephone 200 while establishing the telephone call state by making the telephone call to the operating-side portable telephone 200 with the telephone communication portion 12 so that the operating-side portable telephone 200 takes the telephone call. In other words, the camera-side portable telephone 100 makes the telephone call to the operating-side portable telephone 200 as the originator to establish the communication state (the telephone call state) when the user 40 makes the camera-side portable telephone 100 execute the imaging operation, whereby the camera-side portable telephone 100 can be prevented from interruptive communication before establishing the telephone call state between the same and the operating-side portable telephone 200 by making the telephone call to the operating-side portable telephone 200, and the established telephone call state is not interrupted. Thus, the user 40 can make the camera-side portable telephone 100 execute the imaging operation while reliably occupying the camera-side portable telephone 100 without interruption after the telephone call therefrom, thereby performing the imaging operation at desired timing.

According to the first embodiment, the CPU 11 is formed to control the telephone communication portion 12 to make the telephone call to the operating-side portable telephone 200 on the basis of the operation of the user 40. Thus, the CPU 11 can easily control the telephone communication portion 12 to make the telephone call for ensuring a telephone line necessary for the imaging operation on the basis of the prescribed operation of the user 40 on the camera-side portable telephone 100.

According to the first embodiment, the CPU 11 is formed to control the telephone communication portion 12 to make the telephone call to the operating-side portable telephone 200 when the user 40 sets the camera-side portable telephone 100 to the "remote imaging mode". Thus, the CPU 11 is so triggered by the operation of the user 40 switching the camera-side portable telephone 100 from the operation mode for ordinary telephone communication to the "remote imaging mode" that the same can reliably control the telephone communication portion 12 to make the telephone call to the operating-side portable telephone 200.

According to the first embodiment, the CPU 11 is formed to control the imaging portion 13 to execute the imaging operation on the basis of the operation of the user 40 cutting off the communication state in the telephone call state from the side of the operating-side portable telephone 200. Thus, the CPU 11 of the camera-side portable telephone 100 is so triggered by the general operation of the user 40 "cutting off the telephone call" from the side of the operating-side portable -telephone 200 that the same can reliably control the imaging portion 13 to execute the imaging operation.

According to the first embodiment, the CPU 11 is formed to control the imaging portion 13 to execute the imaging operation by detecting that the user 40 has cut off the telephone call state when the telephone communication portion 12 receives the "end-of-telephone-call signal" for terminating the communication state. Thus, after the operating-side portable telephone 200 converts the operation of the user 40 "cutting off the telephone call" to the "end-of-telephone-call signal" (the signal for terminating the communication state), the camera-side portable telephone 100 receiving the "end-of-telephone-call signal" recognizes the "end-of-telephone-call signal" as an instruction for controlling the imaging portion 13 to execute the imaging operation, whereby the CPU 11 can reliably control the imaging portion 13 to execute the imaging operation through the communication between the portable telephones 100 and 200.

According to the first embodiment, the CPU 11 is formed to control the telephone communication portion 12 to make the telephone call to the operating-side portable telephone 200 on the basis of the identification information (the telephone number) previously acquired by the IR communication portion 14 or the Bluetooth communication portion 15 when making the telephone call to the operating-side portable telephone 200. Thus, the camera-side portable telephone 100 can make the telephone call to (dial) the operating-side portable telephone 200 on the basis of the identification information (the telephone number or the like) previously acquired by the IR communication portion 14 or the Bluetooth communication portion 15, whereby the user 40 may not manually make the telephone call to the camera-side portable telephone 100, and can be prevented from a burden.

According to the first embodiment, the CPU 11 is formed to control the IR communication portion 14 or the Bluetooth communication portion 15 to acquire the identification information (the telephone number or the like) of the operating-side portable telephone 200 when the user 40 sets the camera-side portable telephone 100 to the "remote imaging mode". Thus, the CPU 11 is so triggered by the operation of the user 40 switching the camera-side portable telephone 100 from the operation mode for ordinary telephone communication to the "remote imaging mode" that the same can reliably control the IR communication portion 14 or the Bluetooth communication portion 15 to acquire the identification information of the operating-side portable telephone 200.

According to the first embodiment, the CPU 11 is formed to acquire the identification information through the IR communication (infrared communication) when the identification information has been unacquirable through the Bluetooth communication. Therefore, the CPU 11 can retry to acquire the identification information of the operating-side portable telephone 200 through the IR communication (infrared communication) when the identification information has been unacquirable through the Bluetooth communication. Thus, the CPU 11 can more reliably acquire the identification information of the operating-side portable telephone 200.

According to the first embodiment, the imaging system is so formed that the user 40 can select or input the identification information of the operating-side portable telephone 200, and the CPU 11 is formed to control the telephone communication portion 12 to make the telephone call to the operating-side portable telephone 200 on the basis of the identification information selected or input by the user 40. Thus, the user 40 can easily establish the telephone call state between the camera-side portable telephone 100 and the operating-side portable telephone 200 by directly operating the camera-side portable telephone 100 for selecting or inputting the identification information of the operating-side portable telephone 200. Therefore, the user 40 can easily perform the imaging operation even if the operating-side portable telephone 200 cannot communicate with the IR communication portion 14 or the Bluetooth communication portion 15 of the camera-side portable telephone 100.

(Second Embodiment)

A second embodiment of the present invention is described with reference to FIGS. 2 and 3. According to the second embodiment, a camera-side portable telephone 100 is formed to execute an imaging operation on the basis of a prescribed voice signal or a prescribed tone signal transmitted from an operating-side portable telephone 200, dissimilarly to the aforementioned first embodiment.

According to the second embodiment, a nonvolatile memory 16 is provided with a voice pattern storage portion 16b and a tone signal storage portion 16c in addition to a telephone directory storage portion 16a, as shown in FIG. 2. The voice pattern storage portion 16b is formed to store an "imaging voice signal" having a prescribed volume and a prescribed voice pattern. This voice pattern includes a watchword (such as a watchword "Say cheese!" in a prescribed volume, for example) or the like used for taking a photograph. The tone signal storage portion 16c is formed to store an "imaging tone signal" consisting of a combination of a plurality of prescribed tone signals. The "imaging voice signal" and the "imaging tone signal" are examples of the "first voice signal" and the "first tone signal" in the present invention respectively. The voice pattern storage portion 16b and the tone signal storage portion 16c are examples of the "storage portion" in the present invention respectively.

Each tone signal is generated according to the DTMF (dual-tone multi-frequency) system. This tone signal consists of a composite tone formed by a combination of a tone included in a high group (a high tone group) consisting of four types of tones having different frequencies and a tone included in a low group (a low tone group) consisting of four types of tones having different frequencies. 16 types of signals are formed by multiplying the four types of high tones by the four types of low tones. In general, the 16 types of tone signals are employed in association with the respective ones of 12 types of dial buttons 17c (dial buttons 26c in the operating-side portable telephone 200) of "0" to "9", "*" and "#". The tone signal storage portion 16c is formed to store a combination (the "imaging tone signal") of three tone signals corresponding to "1", "3" and "1", for example, of the dial buttons 17c. The camera-side portable telephone 100 is so formed that the "imaging voice signal" (the voice pattern) and the "imaging tone signal" (the combination of tone signals) are previously registrable therein.

According to the second embodiment, a CPU 11 (see FIG. 2) of the camera-side portable telephone 100 is formed to control an imaging portion 13 (see FIG. 2) to release the shutter on the basis of the "imaging voice signal" or the "imaging tone signal" when a user 40 produces a sound to a microphone 29 (see FIG. 3) of the operating-side portable telephone 200 or presses down any combination of the dial buttons 26c (see FIG. 3) while establishing a telephone call state between the camera-side portable telephone 100 and the operating-side portable telephone 200 by making a telephone call to the operating-side portable telephone 200 so that the operating-side portable telephone 200 takes the telephone call. The operation of the user 40 producing a sound to the microphone 29 or pressing down any combination of the dial buttons 26c is an example of the "prescribed first operation" or the "prescribed operation" in the present invention.

The details of a control flow of the imaging operation of the camera-side portable telephone 100 in a "remote imaging mode" according to the second embodiment are now described with reference to FIGS. 1 to 6.

Figure 6:
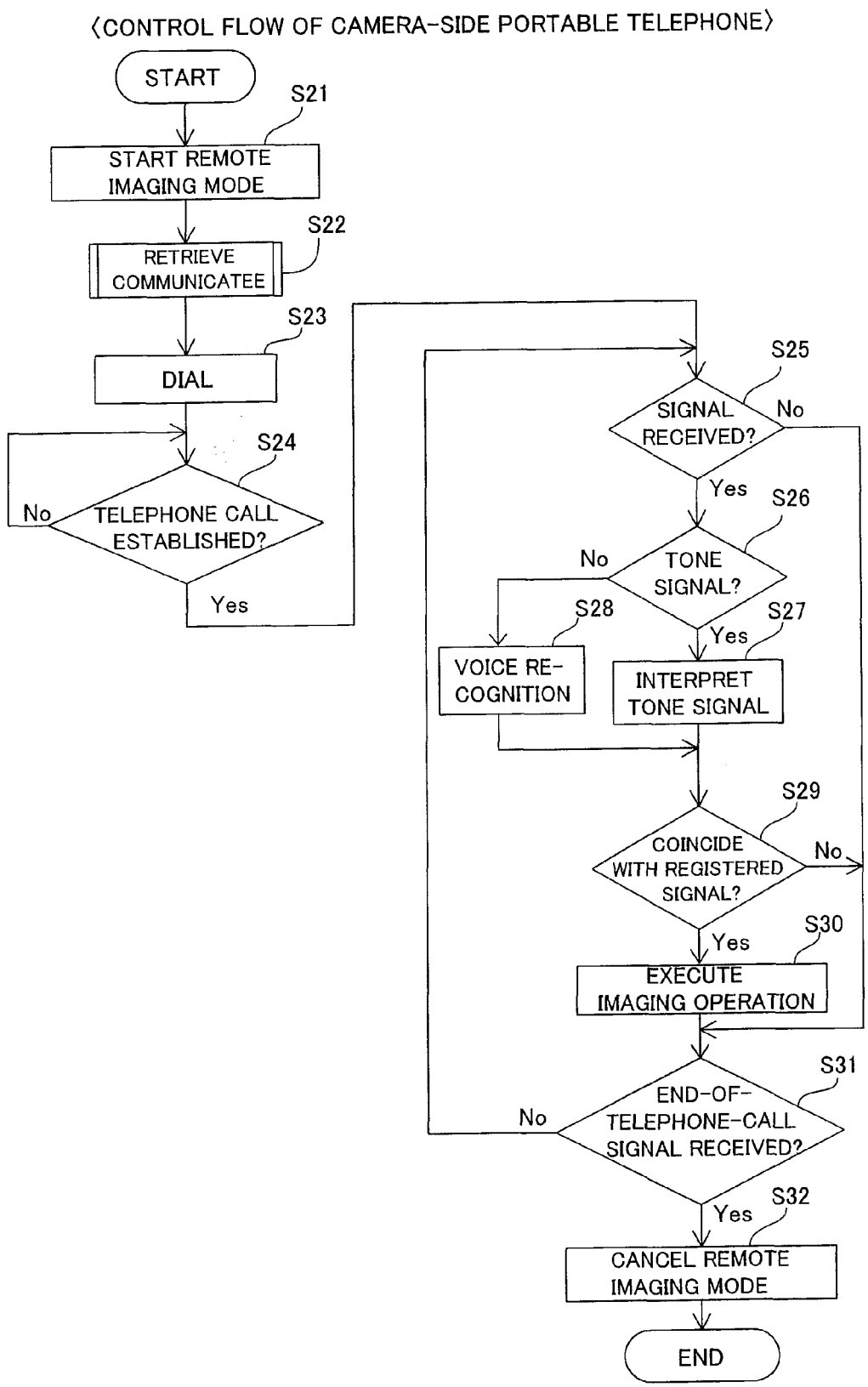
FIG. 6 is a control flow chart for illustrating an imaging operation of a camera-side portable telephone according to a second embodiment of the present invention.

First, the user 40 switches the camera-side portable telephone 100 to the "remote imaging mode" and starts the "remote imaging mode" by operating a selection button 17d (see FIG. 1) at a step S21, as shown in FIG. 6.

Then, the CPU 11 specifies the communicatee (the operating-side portable telephone 200 (see FIG. 3)) at a step S22. In other words, the CPU 11 (see FIG. 2) acquires identification information of the operating-side portable telephone 200 by communication through a Bluetooth communication portion 15, communication through an IR communication portion 14 or an operation of the user 40 retrieving telephone directory data stored in the telephone directory storage portion 16a (see FIG. 2) of the nonvolatile memory 16 of the camera-side portable telephone 100 through an input portion 17. When performing IR communication or near field communication according to the Bluetooth standard at this time, a CPU 21 (see FIG. 3) of the operating-side portable telephone 200 performs communication connection through an IR communication portion 23 (see FIG. 3) or a Bluetooth communication portion 24 (see FIG. 3), thereby executing transmission/receiving of the identification information. The processing at the step S22 is similar to the processing at the steps S2 to S8 of the control flow (see FIG. 5) related to the imaging operation according to the aforementioned first embodiment, and hence redundant description is omitted.

Thereafter the CPU 11 of the camera-side portable telephone 100 dials (makes a telephone call to) the operating-side portable telephone 200 at a step S23. Then, the CPU 11 determines whether or not the telephone call to the operating-side portable telephone 200 has been established at a step S24. When the user 40 presses down a telephone call connection button 26a of the operating-side portable telephone 200 on the basis of an incoming signal from the camera-side portable telephone 100, the telephone call from the camera-side portable telephone 100 to the operating-side portable telephone 200 is established. After the step S24, the CPU 11 performs processing in the state where the telephone call is established until the user 40 cuts off the telephone call from the side of the operating-side portable telephone 200, as shown in FIG. 6.

At a step S25, the CPU 11 determines whether or not the camera-side portable telephone 100 has received a signal (the voice signal or the tone signal) from the operating-side portable telephone 200. If the camera-side portable telephone 100 has received no signal, the CPU 11 advances to a step S31. If the camera-side portable telephone 100 has received the signal (the voice signal or the tone signal) from the operating-side portable telephone 200, on the other hand, the CPU 11 advances to a step S26.

At the step S26, the CPU 11 determines whether or not the received signal is the tone signal, and advances to a step S27 if the determination is of YES. If the received signal is not the tone signal but the voice signal, on the other hand, the CPU 11 advances to a step S28.

At the step S27, the CPU 11 interprets the received tone signal. More specifically, the CPU 11 interprets the tone signal by comparing the received tone signal with the "imaging tone signal" (a combination of tone signals corresponding to three numerals "1", "3" and "1", for example) registered in the tone signal storage portion 16c of the nonvolatile memory 16.

If the received signal is not the tone signal but the voice signal, the CPU 11 recognizes the received voice signal at the step S28. More specifically, the CPU 11 recognizes the voice signal by comparing the volume and the voice pattern of the received voice signal with the volume and the voice pattern (such as the watchword "Say cheese!" in the prescribed volume, for example) of the "imaging voice signal" previously registered in the voice pattern storage portion 16b of the nonvolatile memory 16.

At a step S29, the CPU 11 determines whether or not the received tone signal (in the case of the step S27) coincides with the "imaging tone signal" registered in the voice pattern storage portion 16b, or whether or not the received voice signal (in the case of the step S28) coincides with the "imaging voice signal" registered in the voice pattern storage portion 16b. If the received signal (the tone signal or the voice signal) coincides with the registered imaging signal (the "imaging tone signal" or the "imaging voice signal"), the CPU 11 advances to a step S30. If the received signal (the tone signal or the voice signal) does not coincide with the registered imaging signal (the "imaging tone signal" or the "imaging voice signal"), on the other hand, the CPU 11 advances to a step S31.

At the step S30, the CPU 11 controls the imaging portion 13 to execute the imaging operation on the basis of the received "imaging tone signal" or the received "imaging voice signal". Thus, the nonvolatile memory 16 preserves image data of objects 51 (see FIG. 4).

Then, the CPU 11 advances to the step S31, and determines whether or not an "end-of-telephone-call signal" has been detected. If the user 40 intends to continue the imaging operation, he/she retransmits the signal (the tone signal or the voice signal) to the camera-side portable telephone 100 without cutting off the telephone call from the side of the operating-side portable telephone 200, so that the CPU 11 repeats the operations through the steps S25 to S30. If the user 40 presses down a cutoff button 26b (see FIG. 3) of the operating-side portable telephone 200 to cut off the telephone call, on the other hand, the CPU 11 detects the "end-of-telephone-call signal", and advances to a step S32. Then, the CPU 11 cancels the "remote imaging mode" at the step S32. Thus, the control flow of the imaging operation in the "remote imaging mode"

of the camera-side portable telephone 100 according to the second embodiment is terminated.

According to the second embodiment, as hereinabove described, the CPU 11 is formed to control the imaging portion 13 to execute the imaging operation on the basis of at least either the "imaging voice signal" (such as the watchword "Say cheese!" in the prescribed volume, for example) or the "imaging tone signal" (the combination of the tone signals corresponding to the three numerals "1", "3" and "1", for example) received from the operating-side portable telephone 200. When the user 40 transmits the "imaging voice signal" to the camera-side portable telephone 100 through the microphone 29 of the operating-side portable telephone 200 or transmits the "imaging tone signal" to the camera-side portable telephone 100 by operating any combination of the dial buttons 26c of the operating-side portable telephone 200, therefore, the CPU 11 of the camera-side portable telephone 100 is so triggered by receiving the "imaging voice signal" or the "imaging tone signal" that the same can easily control the imaging portion 13 to execute the imaging operation.

According to the second embodiment, the CPU 11 is formed to control the imaging portion 13 to execute the imaging operation when at least either the voice signal or the tone signal received from the operating-side portable telephone 200 coincides with the "imaging voice signal" stored in the voice pattern storage portion 16b or the "imaging tone signal" stored in the tone signal storage portion 16c. Therefore, the CPU 11 can easily control the imaging portion 13 to execute the imaging operation after easily distinguishing the "imaging voice signal" or the "imaging tone signal" for executing the imaging operation by simply comparing the voice signal or the tone signal received from the operating-side portable telephone 200 with the "imaging voice signal" stored in the voice pattern storage portion 16b or the "imaging tone signal" stored in the tone signal storage portion 16c.

According to the second embodiment, the "imaging voice signal" is formed by the signal related to the prescribed voice pattern and the prescribed volume, whereby the user 40 can execute the imaging operation by simply transmitting a voice of at least a constant volume to the camera-side portable telephone 100 from the microphone 29 of the operating-side portable telephone 200, for example. When the "imaging voice signal" is formed by a voice pattern of a watchword or the like, the user 40 can make the camera-side portable telephone 100 execute the imaging operation at desired timing by transmitting the prescribed watchword (the "imaging voice signal") to the camera-side portable telephone 100 from the operating-side portable telephone 200 at the desired timing.

According to the second embodiment, the prescribed voice pattern is formed by the voice pattern of the watchword such as "Say, cheese!" or the like used for taking a photograph, whereby the user 40 can easily make people becoming the objects 51 recognize the imaging timing when taking a group photograph or the like.

According to the second embodiment, the "imaging tone signal" is formed by a prescribed combination (the combination of "1", "3" and "1" of the dial buttons 17c, for example) of a plurality of tone signals, whereby the CPU 11 can control the imaging portion 13 to execute the imaging operation when the operating-side portable telephone 200 transmits a tone signal of a combination coinciding with the "imaging tone signal". Thus, the camera-side portable telephone 100 can be inhibited from an imaging operation, resulting from an erroneous input operation of any combination of the dial buttons 26c, at timing not intended by the user 40, dissimilarly to a case of making the imaging portion 13 execute the imaging operation by inputting a single one of the dial buttons 26c.

(Modification of Second Embodiment)

A modification of the second embodiment is now described with reference to FIGS. 1, 4, 7 and 8. According to the modification of the second embodiment, a camera-side portable telephone 300 is formed to transmit a preview image and to accept specification of an imaging range on the basis of another prescribed voice signal or another prescribed tone signal in addition to the aforementioned structure of the second embodiment in which the camera-side portable telephone 100 executes the imaging operation on the basis of the prescribed voice signal or the prescribed tone signal from the operating-side portable telephone 200, dissimilarly to the aforementioned second embodiment. The camera-side portable telephone 300 is an example of the "portable telephone" or the "imaging-side portable telephone" in the present invention.

Figure 7:
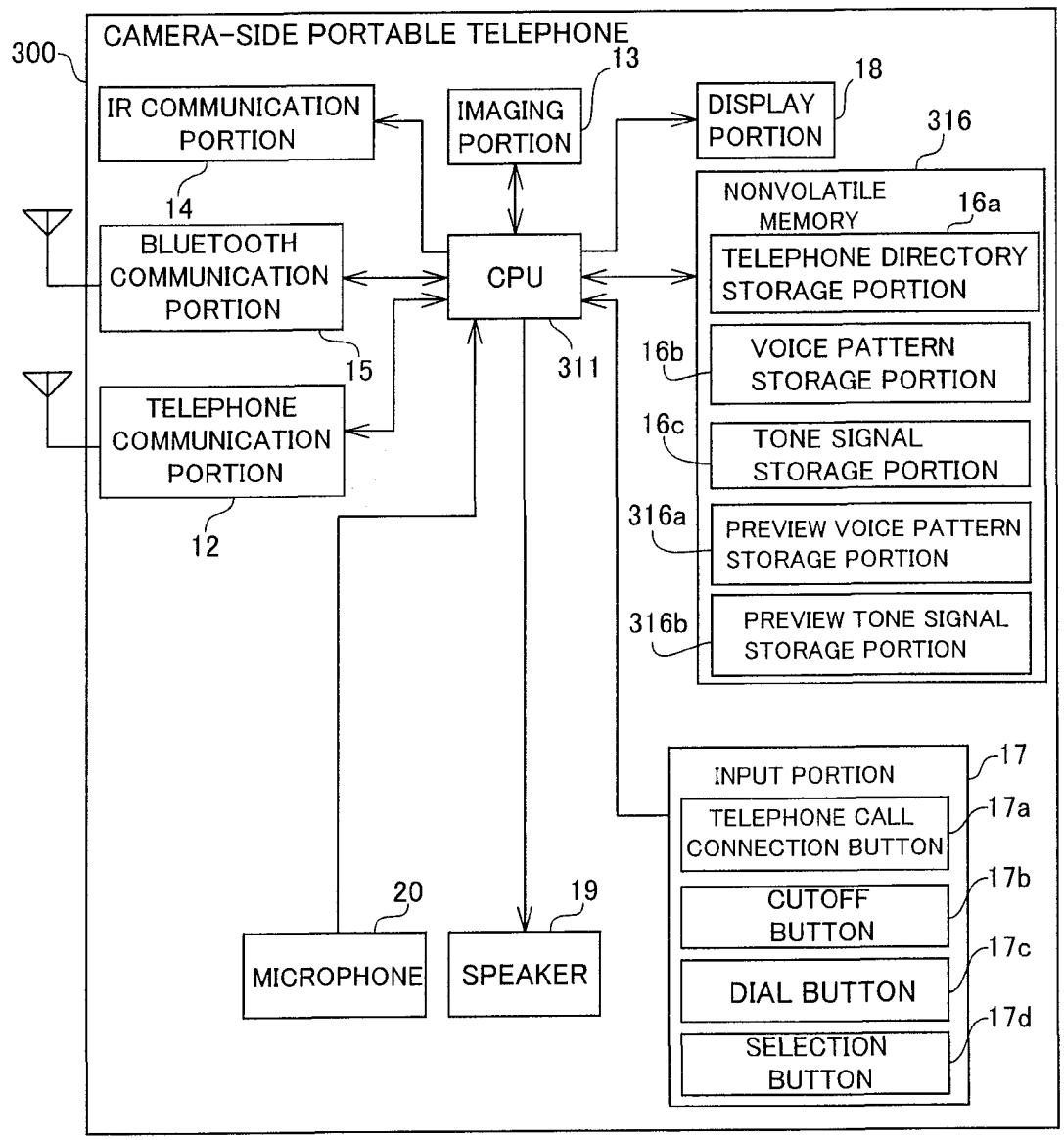
FIG. 7 is a block diagram for illustrating a camera-side portable telephone according to a modification of the second embodiment of the present invention.

The camera-side portable telephone 300 according to the modification of the second embodiment includes a CPU 311, a telephone communication portion 12, an imaging portion 13, an IR communication portion 14, a Bluetooth communication portion 15, a nonvolatile memory 316, an input portion 17, a display portion 18, a speaker 19 and a microphone 20, as shown in FIG. 7. Portions of the camera-side portable telephone 300 identical in structure to those of the camera-side portable telephone 100 according to the aforementioned first embodiment are denoted by the same reference numerals. The CPU 311 is an example of the "control portion" in the present invention.

According to the modification of the second embodiment, the camera-side portable telephone 300 is formed to be capable of performing the imaging operation and a preview imaging operation on the basis of a plurality of different voice signals or a plurality of different tone signals received from an operating-side portable telephone 200.

According to the modification of the second embodiment, the nonvolatile memory 316 is provided with a preview voice pattern storage portion 316a and a preview tone signal storage portion 316b in addition to a voice pattern storage portion 16b storing an "imaging voice signal" and a tone signal storage portion 16c storing an "imaging tone signal", as shown in FIG. 7.

The preview voice pattern storage portion 316a is formed to store a "preview voice signal" having a volume and a voice pattern different from that of the "imaging voice signal" (such as a watchword "Say cheese!" in a prescribed volume, for example). The preview tone signal storage portion 316b is formed to store a "preview tone signal" consisting of a combination of tone signals different from that of the "imaging tone signal" (a combination of tone signals corresponding to "1", "3" and "1", for example). The camera-side portable telephone 300 is so formed that a user 40 previously registers the "preview voice signal" (the voice pattern) and the "preview tone signal" (the combination of tone signals) therein. The "preview voice signal" and the "preview tone signal" are examples of the "second voice signal" and the "second tone signal" in the present invention respectively.

According to the modification of the second embodiment, the CPU 311 is formed to control the imaging portion 13 to execute the preview imaging operation described later when a voice pattern received from the operating-side portable telephone 200 coincides with the voice pattern (the "preview voice signal") stored in the preview voice pattern storage portion 316a of the nonvolatile memory 316 or a tone signal received from the operating-side portable telephone 200 coincides with the combination of tone signals (the "preview tone signal") stored in the preview tone signal storage portion 316b. The CPU 311 is formed to compress image data of an acquired preview image 350 (see FIG. 8) and to transmit the same to the operating-side portable telephone 200. The preview image 350 is an example of the "preview image" in the present invention.

The preview imaging operation is an operation of acquiring the preview image 350 with a number of pixels (1280 by 768 pixels (about one million pixels), for example) smaller than the number of pixels (2048 by 1536 pixels (about three million pixels), for example) for executing the imaging operation on the basis of an imaging signal (the "imaging voice signal" or the "imaging tone signal"). The CPU 311 employs a method of culling the aforementioned number of pixels (2048 by 1536 pixels) of an image acquired by the imaging portion 13 in a prescribed pattern or a method of obtaining a weighted average of values of nearby pixels every pixel of the image acquired by the imaging portion 13, for example, as a method of subtracting the number of pixels. The CPU 311 is formed to control the imaging portion 13 to acquire the preview image 350 as either a moving picture or a still picture in the preview imaging operation.

In a case of acquiring the preview image 350 as a moving picture in the preview imaging operation, the CPU 311 compresses the moving picture acquired by the preview imaging operation according to a prescribed compression system (MPEG or the like) and transmits the preview image 350 to the operating-side portable telephone 200 through videophone communication employing the telephone communication portion 12. In a case of acquiring the preview image 350 as a still picture in the preview imaging operation, on the other hand, the CPU 311 compresses the still picture acquired by the preview imaging operation according to another prescribed compression system (JPEG or the like) and transmits the preview image 350 to the operating-side portable telephone 200 through data communication (an e-mail or the like) employing the telephone communication portion 12. The CPU 311 is formed to control the imaging portion 13 to intermittently acquire the still picture (the preview image 350) and to continuously transmit the same to the operating-side portable telephone 200 in this case.

Figure 8:
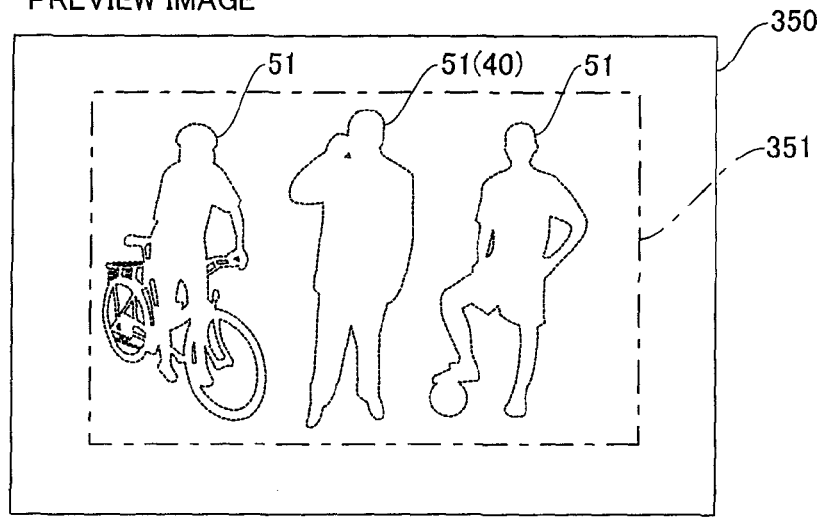
FIG. 8 is a diagram for illustrating a preview image acquired by the camera-side portable telephone shown in FIG. 7.
Figure 9:
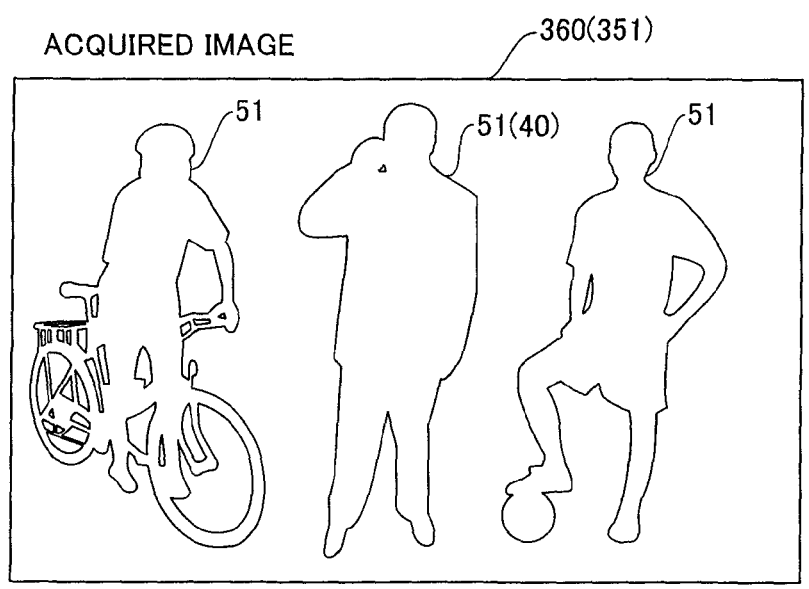
FIG. 9 is a diagram for illustrating an acquired image obtained by the camera-side portable telephone shown in FIG. 7.

As shown in FIG. 8, the CPU 311 is formed to receive "imaging range information" indicating a prescribed imaging range 351 (surrounded by one-dot chain lines) included in the preview image 350 from the operating-side portable telephone 200 (see FIG. 4) through the telephone communication portion 12 (see FIG. 7). Further, the CPU 311 is formed to set the imaging range of the image finally acquired on the basis of the "imaging voice signal" or the "imaging tone signal" on the basis of the received "imaging range information". Consequently, the CPU 311 is so formed that the imaging range of an acquired image 360 obtained on the basis of the "imaging voice signal" or the "imaging tone signal" coincides with the imaging range 351, as shown in FIG. 9. Thus, according to the modification of the second embodiment, the user 40 can select the imaging range (the imaging range 351 shown in FIG. 8) for obtaining the acquired image 360 while observing the preview image 350. The "imaging range information" is an example of the "information related to an imaging range" in the present invention.

According to the modification of the second embodiment, the operating-side portable telephone 200 is formed to display the preview image 350 (see FIG. 8) received from the camera-side portable telephone 300 on a display portion 27 (see FIG. 1). When the user 40 selects the imaging range 351 from the preview image 350 displayed on the display portion 27 through a selection button 26d (see FIG. 1), a CPU 21 of the operating-side portable telephone 200 generates the "imaging range information" and transmits the same through a tone signal. The "imaging range information" is constituted of coordinate information of the opposite angles of the imaging range 351, for example. The remaining structure of the modification of the second embodiment is similar to that of the aforementioned first embodiment.

A control flow of the camera-side portable telephone 300 in the remote imaging mode according to the modification of the second embodiment of the present invention is now described with reference to FIGS. 2, 3, 5 and 7 to 11.

Figure 10:
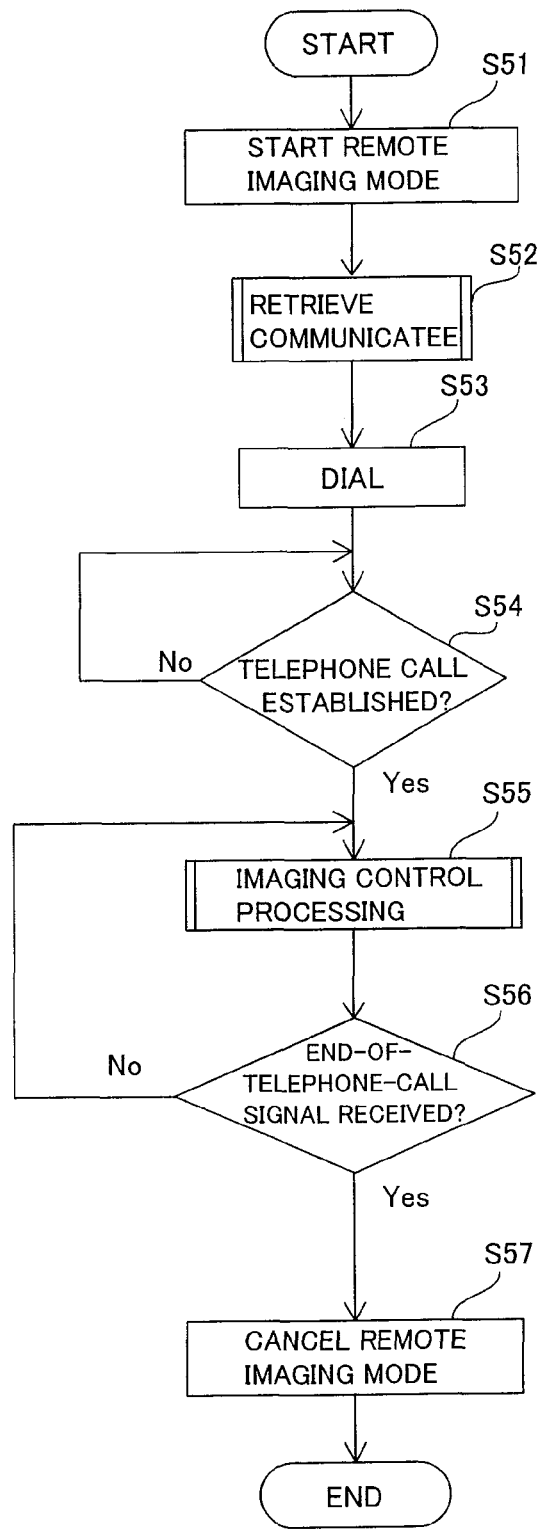
FIGS. 10 and 11 are control flow charts for illustrating an imaging operation of the camera-side portable telephone according to the modification of the second embodiment of the present invention.

First, the user 40 switches the camera-side portable telephone 300 to the "remote imaging mode" and starts the "remote imaging mode" by operating the input portion 17 (see FIG. 7) at a step S51, as shown in FIG. 10.

Then, the CPU 311 specifies the communicatee (the operating-side portable telephone 200) at a step S52. In other words, the CPU 311 acquires identification information of the operating-side portable telephone 200 by communication through the Bluetooth communication portion 15, communication through the IR communication portion 14 or an operation of the user 40 retrieving data (telephone directory data) stored in the nonvolatile memory 316 of the camera-side portable telephone 300 through the input portion 17. When performing IR communication or near field communication according to the Bluetooth standard at this time, the CPU 21 of the operating-side portable telephone 200 performs communication connection through an IR communication portion 23 or a Bluetooth communication portion 24, thereby executing transmission/receiving of the identification information. The processing at the step S52 is similar to the processing at the steps S2 to S8 of the control flow (see FIG. 5) related to the imaging operation according to the aforementioned first embodiment, and hence redundant description is omitted.

Thereafter the CPU 311 dials (makes a telephone call to) the operating-side portable telephone 200 at a step S53. Then, the CPU 311 determines whether or not the telephone call to the operating-side portable telephone 200 has been established at a step S54. When the user 40 presses down a telephone call connection button 26a of the operating-side portable telephone 200 on the basis of an incoming signal from the camera-side portable telephone 300, the telephone call from the camera-side portable telephone 300 to the operating-side portable telephone 200 is established. After the step S54, the CPU 311 performs processing in the state where the telephone call is established until the user 40 cuts off the telephone call from the side of the operating-side portable telephone 200, as shown in FIG. 10.

Figure 11:
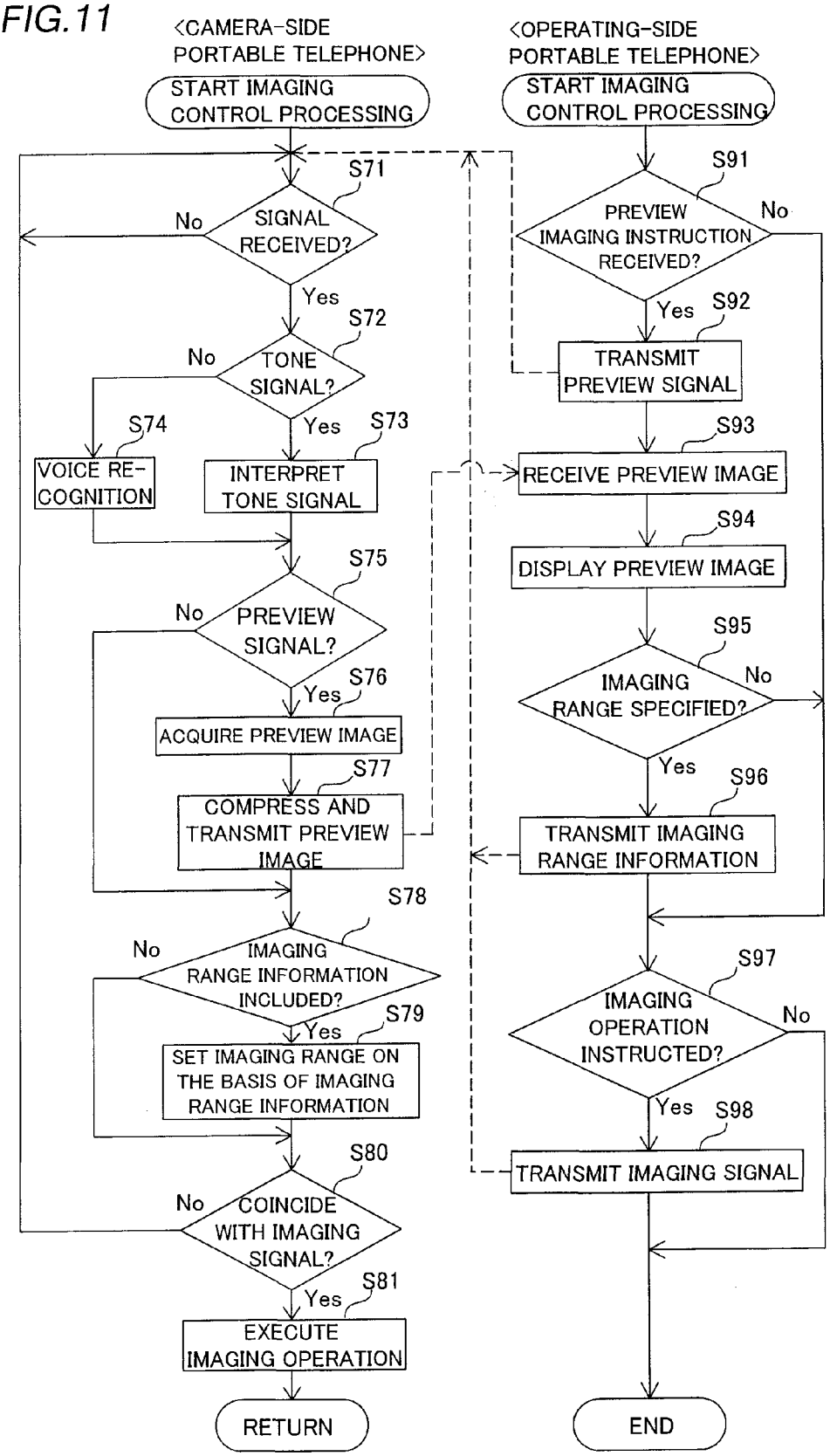

According to the modification of the second embodiment, the CPU 311 controls the imaging portion 13 to execute the imaging operation or the preview imaging operation on the basis of the voice signal or the tone signal received from the operating-side portable telephone 200 in the state establishing the telephone call from the camera-side portable telephone 300 to the operating-side portable telephone 200 at a subsequent step S55. The details of the processing at the step S55 are now described with reference to FIG. 11. FIG. 11 also shows a control flow of the operating-side portable telephone 200 in addition to the control flow of the camera-side portable telephone 300, in order to illustrate the communication between the camera-side portable telephone 300 and the operating-side portable telephone 200.

As shown in FIG. 11, the CPU 311 (see FIG. 7) of the camera-side portable telephone 300 determines whether or not a signal (the voice signal or the tone signal) has been received from the operating-side portable telephone 200 at a step S71. If no signal has been received, the CPU 311 repeats the determination at the step S71, thereby waiting for the signal from the operating-side portable telephone 200.

In the operating-side portable telephone 200, on the other hand, the CPU 21 (see FIG. 3) determines whether or not a preview imaging instruction has been received at a step S91. If the user 40 inputs (produces) the "preview voice signal" through the microphone 29 (see FIG. 3) or presses down the dial buttons 26c in the combination corresponding to the "preview tone signal", the CPU 21 advances to a step S92, and transmits the received voice or the received tone signal to the camera-side portable telephone 300 through a telephone communication portion 22 (see FIG. 3). If the preview signal (the "preview tone signal" or the "preview voice signal") has not been received, the CPU 21 advances to a step S97. The operation of inputting (producing) the "preview voice signal" and the operation of pressing down the dial buttons 26c in the combination corresponding to the "preview tone signal" are examples of the "second operation" in the present invention.

When the camera-side portable telephone 300 receives the signal from the operating-side portable telephone 200, the CPU 311 of the camera-side portable telephone 300 advances to the step S72, and determines whether or not the received signal is a tone signal. If the received signal is a tone signal, the CPU 311 advances to a step S73. If the received signal is not a tone signal but a voice signal, on the other hand, the CPU 311 advances to a step S74.

At the step S73, the CPU 311 interprets the received tone signal. More specifically, the CPU 311 interprets the tone signal by comparing the combination of the received tone signal with the "imaging tone signal" and the "preview tone signal" registered in the tone signal storage portion 16c and the preview tone signal storage portion 316b of the nonvolatile memory 316 respectively.

If the received signal is not the tone signal but the voice signal, the CPU 311 recognizes the received voice signal at the step S74. More specifically, the CPU 311 recognizes the voice signal by comparing the volume and the voice pattern of the received voice signal with the "imaging voice signal" and the "preview voice signal" stored in the voice pattern storage portion 16b and the preview voice pattern storage portion 316a of the nonvolatile memory 316 respectively.

At a step S75, the CPU 311 determines whether or not the received tone signal (in the case of the step S73) coincides with the "preview tone signal" registered in the preview tone signal storage portion 316b, or whether or not the received voice signal (in the case of the step S74) coincides with the "preview voice signal" stored in the preview voice pattern storage portion 316a. If the received signal (the tone signal or the voice signal) coincides with the registered preview signal (the "preview tone signal" or the "preview voice signal"), the CPU 311 advances to a step S76. If the received signal (the tone signal or the voice signal) does not coincide with the registered preview signal (the "preview tone signal" or the "preview voice signal"), on the other hand, the CPU 311 advances to a step S78.

At the step S76, the CPU 311 controls the imaging portion 13 to execute the preview imaging operation on the basis of the received preview signal (the "preview tone signal" or the "preview voice signal"). Thus, the imaging portion 13 (see FIG. 2) acquires the preview image 350 (see FIG. 8) as a moving picture or a still picture. At a step S77, the CPU 311 transmits the acquired preview image 350 to the operating-side portable telephone 200 through the telephone communication portion 12: When the preview image 350 is formed by a moving picture, the CPU 311 compresses the preview image 350 according to the prescribed compression system (MPEG or the like) and transmits the same to the operating-side portable telephone 200 through videophone communication. When the preview image 350 is formed by a still picture, on the other hand, the CPU 311 compresses the preview image 350 according to the other prescribed compression system (JPEG or the like) and transmits the preview image 350 to the operating-side portable telephone 200 through data communication (an e-mail or the like).

After transmitting the preview image 350, the CPU 311 makes determinations of "NO" at steps S78 and S80 described later respectively, to return to the step S71.

When the CPU 311 transmits the preview image 350 to the operating-side portable telephone 200, the telephone communication portion 22 of the operating-side portable telephone 200 receives the preview image 350 at a step S93. Then, the CPU 21 displays the received preview image 350 (see FIG. 8) on the display portion 27 at a step S94.

At a step S95, the CPU 21 of the operating-side portable telephone 200 determines whether or not the imaging range 351 has been specified. When the user 40 specifies the imaging range 351 with a cursor or the like of the operating-side portable telephone 200 as shown in FIG. 8, the CPU 21 advances to a step S96. If the imaging range 351 is not specified, on the other hand, the CPU 21 advances to a step S97.

At the step S96, the CPU 21 generates the "imaging range information" such as the coordinate information of the opposite angles of the imaging range 351, and transmits the "imaging range information" to the camera-side portable telephone 300 by a tone signal through the telephone communication portion 22.

When the camera-side portable telephone 300 receives the "imaging range information", the CPU 311 advances to the step S78. In other words, the CPU 311 determines that a signal has been received at the step S71 again, and advances to the step S75 through the step S73. Then, the CPU 311 determines that the signal is not a preview signal (makes a determination of "NO") at the step S75, and advances to the step S78. At the step S78, the CPU 311 determines whether or not the signal includes the "imaging range information". If the received tone signal includes the "imaging range information", the CPU 311 advances to a step S79. If the received tone signal does not include the "imaging range information", on the other hand, the CPU 311 advances to the step S80.

At the step S79, the CPU 311 sets the imaging range 351 for executing the imaging operation on the basis of the "imaging voice signal" or the "imaging tone signal" on the basis of the received "imaging range information". More specifically, the CPU 311 adjusts the imaging range of the acquired image 360 to match with the imaging range 351 specified by the user 40, as shown in FIG. 8. After specifying the imaging range 351, the CPU 311 advances the step S80 described later, and returns to the step S71 when making a determination of "NO" at the step S80.

Thereafter the CPU 21 of the operating-side portable telephone 200 determines whether or not the imaging operation is instructed at the step S97. If the user 40 inputs (produces) the "imaging voice signal" through the microphone 29 or presses down the dial buttons 26c in the combination corresponding to the "imaging tone signal", the CPU 21 advances to a step S98, and transmits the received voice signal or the received tone signal to the camera-side portable telephone 300 through the telephone communication portion 22. After the CPU 21 transmits the voice signal or the tone signal to the camera-side portable telephone 300 at the step S98 or if the user 40 does not input the imaging signal (the "imaging voice signal" or the "imaging tone signal") at the step S97, the CPU 21 of the operating-side portable telephone 200 terminates the imaging control processing.

When the camera-side portable telephone 300 receives the imaging signal (the "imaging voice signal" or the "imaging tone signal"), the CPU 311 determines that the signal has been received at the step S71 again, and advances to the step S80. In other words, the CPU 311 determines that the image is not the preview imaging signal (makes a determination of "NO") at the step S75 through the step S73 (in the case of the "imaging tone signal") or the step S74 (in the case of the "imaging voice signal"), and advances to the step S78. Then, the CPU 311 determines that the signal does not include the "imaging range information" (makes a determination of "NO") at the step S78, and advances to the step S80.

At the step S80, the CPU 311 determines whether or not the received tone signal (in the case of advancing to the step S80 through the step S73) coincides with the "imaging tone signal" registered in the tone signal storage portion 16c, or whether or not the received voice signal (in the case of advancing to the step S80 through the step S74) coincides with the "imaging voice signal" stored in the voice pattern storage portion 16b. If the received signal (the tone signal or the voice signal) coincides with the registered imaging signal (the "imaging tone signal" or the "imaging voice signal"), the CPU 311 advances to a step S81. If the received signal (the tone signal or the voice signal) does not coincide with the registered imaging signal (the "imaging tone signal" or the "imaging voice signal"), on the other hand, the CPU 311 returns to the step S71.

At the step S81, the CPU 311 controls the imaging portion 13 to execute the imaging operation on the basis of the received imaging signal (the "imaging tone signal" or the "imaging voice signal"). If the imaging range 351 is set on the basis of the "imaging range information", the imaging portion 13 obtains the acquired image 360 (see FIG. 9) matching with the imaging range 351. Thus, the nonvolatile memory 316 preserves image data of objects 51 (see FIG. 9). The imaging portion 13 obtains the acquired image 360 without reducing the number of pixels, dissimilarly to the case of acquiring the preview image 350. Thereafter the CPU 311 terminates the imaging control processing, and returns to processing subsequent to the step S55 shown in FIG. 10.

Then, the CPU 311 advances to a step S56, and determines whether or not an "end-of-telephone-call signal" has been detected. If the user 40 intends to continue the imaging operation, he/she retransmits the signal (the tone signal or the voice signal) to the camera-side portable telephone 300 without cutting off the telephone call from the side of the operating-side portable telephone 200, so that the CPU 311 repeats the processing of the step S55. If the user 40 presses down a cutoff button 26b of the operating-side portable telephone 200 to cut off the telephone call, on the other hand, the CPU 311 detects the "end-of-telephone-call signal", and advances to a step S57. Then, the CPU 311 cancels the "remote imaging mode" at the step S57.

Thus, the control flow of the imaging operation in the "remote imaging mode" of the camera-side portable telephone 300 according to the modification of the second embodiment is terminated.

According to the modification of the second embodiment, as hereinabove described, the CPU 311 is formed to control the imaging portion 13 to acquire the preview image 350 before executing the imaging operation and to transmit the acquired preview image 350 to the operating-side portable telephone 200 when receiving the "preview voice signal" different from the "imaging voice signal" or the "preview tone signal" different from the "imaging tone signal". Thus, the operating-side portable telephone 200 can receive the preview image 350 before the imaging portion 13 executes the imaging operation on the basis of the imaging signal (the "imaging voice signal" or the "imaging tone signal"), whereby the user 40 can finely control the position, the angle etc. of the camera-side portable telephone 300 (the imaging portion 13) or the objects 51 while confirming the preview image 350 displayed on the display portion 27.

According to the modification of the second embodiment, the CPU 311 is formed to control the imaging portion 13 to acquire the preview image 350 with the number of pixels (1280 by 768 pixels (about one million pixels), for example) smaller than the number of pixels (2048 by 1536 pixels (about three million pixels), for example) for executing the imaging operation on the basis of the "imaging voice signal" or the "imaging tone signal" in the case of receiving the "preview voice signal" or the "preview tone signal" and to transmit the acquired preview image 350 to the operating-side portable telephone 200 in a state subjected to data compression (MPEG or JPEG). Thus, the quantity of data of the preview image 350 can be reduced, whereby the time required for data transmission can also be reduced. Therefore, the user 40 can smoothly confirm and finely control the position, the angle etc. of the camera-side portable telephone 300 or the objects 51 through the preview image 350 in advance of the imaging operation.

According to the modification of the second embodiment, the CPU 311 is formed to receive the "imaging range information" indicating the imaging range 351 included in the preview image 350 from the operating-side portable telephone 200 through the telephone communication portion 12 and to set the imaging range for executing the imaging operation on the basis of the "imaging voice signal" or the "imaging tone signal" on the basis of the "imaging range information". Thus, the user 40 can transmit the "imaging range information" to the camera-side portable telephone 300 on the basis of the imaging range 351 after specifying the region (the imaging range 351) to be subjected to the imaging operation from the preview image 350, whereby the imaging portion 13 can acquire an image of only the imaging range 351 desired by the user 40 when executing the imaging operation on the basis of the "imaging voice signal" or the "imaging tone signal".

According to the modification of the second embodiment, the CPU 311 is formed to control the imaging portion 13 to acquire the preview image 350 before executing the imaging operation on the basis of at least either the "preview voice signal" or the "preview tone signal" from the operating-side portable telephone 200 and to transmit the acquired preview image 350 to the operating-side portable telephone 200. Thus, the operating-side portable telephone 200 can easily obtain the preview image 350 with at least either the "preview voice signal" different from the "imaging voice signal" or the "preview tone signal" different from the "imaging tone signal".

According to the modification of the second embodiment, the CPU 311 is formed to transmit the preview image 350 acquired on the basis of the operation of the user 40 inputting (producing) the "preview voice signal" or pressing down the dial buttons 26c in the combination corresponding to the "preview tone signal" to the operating-side portable telephone 200 through the telephone communication portion 12 performing telephone communication. Thus, the CPU 311 can quickly transmit the preview image 350 to the operating-side portable telephone 200 through a telephone line. In other words, the camera-side portable telephone 300 can transmit the preview image 350 to the operating-side portable telephone 200 with immediacy, dissimilarly to a case of data-transmitting the preview image 350 through a network line via an Internet server, for example, other than the telephone line. Therefore, the user 40 can perform the imaging operation at desired timing while quickly confirming the preview image 350.

According to the modification of the second embodiment, the CPU 311 is formed to maintain the telephone call state between the camera-side portable telephone 300 and the operating-side portable telephone 200 after transmitting the preview image 350 to the operating-side portable telephone 200. Thus, the telephone call state between the camera-side portable telephone 300 and the operating-side portable telephone 200 is maintained also after the CPU 311 transmits the preview image 350 to the operating-side portable telephone 200 through telephone communication, whereby the user 40 can make the CPU 311 transmit the preview image 350 to the operating-side portable telephone 200 again by inputting (producing) the "preview voice signal" again or pressing down the dial buttons 26c in the combination corresponding to the "preview tone signal" again. Further, the telephone call state between the camera-side portable telephone 300 and the operating-side portable telephone 200 is so maintained after the transmission of the preview image 350 that the user 40 can perform the imaging operation at desired timing. The remaining effects of the modification of the second embodiment are similar to those of the aforementioned first embodiment.

Although the present invention has been described and illustrated in detail, it is clearly understood that the same is by way of illustration and example only and is not to be taken by way of limitation, the spirit and scope of the present invention being limited only by the terms of the appended claims.

For example, while the camera-side portable telephone 100 (300) is so formed that the CPU 11 (311) is triggered by the operation of the user 40 pressing down the cutoff button 26b of the operating-side portable telephone 200, producing a sound to the microphone 29 of the operating-side portable telephone 29 or pressing down any combination of the dial buttons 26c for generating the tone signal to control the imaging portion 13 to execute the imaging operation in each of the aforementioned first and second embodiments and the modification of the second embodiment, the present invention is not restricted to this. For example, the camera-side portable telephone 100 (300) may alternatively be so formed that the CPU 11 (311) is triggered by an operation of the user 40 swiftly shaking (inclining) the operating-side portable telephone 200 in a prescribed direction through an acceleration sensor or the like stored therein to control the imaging portion 13 to execute the imaging operation.

While the CPU 11 (311) of the camera-side portable telephone 100 (300) is formed to control the imaging portion 13 to execute the imaging operation on the basis of the "imaging voice signal" or the "imaging tone signal" in each of the aforementioned second embodiment and the modification thereof, the present invention is not restricted to this. Alternatively, a control portion may be formed to control the imaging portion to execute the imaging operation on the basis of a signal formed by combining a first voice signal and a first tone signal with each other.

While the CPU 11 (311) of the camera-side portable telephone 100 (300) is formed to control the imaging portion 13 to execute the imaging operation on the basis of the "imaging voice signal" having the prescribed volume and the prescribed voice pattern in each of the aforementioned second embodiment and the modification thereof, the present invention is not restricted to this. Alternatively, the control portion may be formed to control the imaging portion to execute the imaging operation on the basis of only a prescribed volume or a prescribed voice pattern as a first voice signal.

While the voice pattern of the "imaging voice signal" includes a watchword (such as the watchword "Say cheese!" in the prescribed volume, for example) or the like used for taking a photograph in each of the aforementioned second embodiment and the modification thereof, the present invention is not restricted to this. Alternatively, a voice pattern of a first voice signal may include a watchword or the like other than that used for taking a photograph.

While the "imaging tone signal" is in the combination of the plurality of (three) prescribed tone signals in each of the aforementioned second embodiment and the modification thereof, the present invention is not restricted to this. Alternatively, a first tone signal may be formed by a single tone signal. Further alternatively, the first tone signal may be formed by a combination of two or at least four tone signals.

While the camera-side portable telephone 100 (300) is provided with the IR communication portion 14 and the Bluetooth communication portion 15 each performing radio communication different from radio telephone communication with the operating-side portable telephone 200 in each of the aforementioned first and second embodiments and the modification of the second embodiment, the present invention is not restricted to this. In other words, the "second communication portion" in the present invention may not be provided, so that an operator manually retrieves or inputs the identification information of the operating-side portable telephone. Alternatively, a communication portion performing radio communication other than the infrared communication and the near field communication according to the Bluetooth standard may be provided as the "second communication portion" in the present invention. For example, a communication portion performing near field communication employed for the so-called noncontact IC card may be provided.

While the camera-side portable telephone 300 is formed to control the imaging portion 13 to execute the preview imaging operation when the user 40 transmits the "preview voice signal" or the "preview tone signal" from the operating-side portable telephone 200 in the telephone call state in the modification of the aforementioned second embodiment, the present invention is not restricted to this. Alternatively, the user 40 may perform an operation generating a signal other than the aforementioned voice signal or the aforementioned tone signal, so that the camera-side portable telephone 300 controls the imaging portion 13 to execute the preview imaging operation.

While the imaging portion 13 is formed to acquire the preview image 350 with the number of pixels smaller than the number of pixels for executing the imaging operation on the basis of the imaging signal (the "imaging voice signal" or the "imaging tone signal") in the modification of the aforementioned second embodiment, the present invention is not restricted to this. Alternatively, the imaging portion 13 may acquire the preview image 350 with the same number of pixels as that of the acquired image 360.

While the CPU 21 of the operating-side portable telephone 200 is formed to transmit the "imaging range information" indicating the imaging range 351 through a tone signal in the modification of the aforementioned second embodiment, the present invention is not restricted to this. Alternatively, the CPU 21 may transmit the "imaging range information" through a voice signal other than the tone signal, a message employing an electronic mail, data communication employing a videophone, a message employing SMS (short message service) which is a push type electronic mail, or the like.

While the CPU 21 is formed to generate the tone signal corresponding to the combination of the pressed dial buttons 26c (any combination of "0" to "9", "*" and "#") and to transmit the tone signal corresponding to the combination of the pressed dial buttons 26c to the camera-side portable telephone 100 (300) in each of the aforementioned first and second embodiments and the modification of the second embodiment, the present invention is not restricted to this. According to the present invention, the CPU 21 may not transmit the tone signal following the operation of the user 40 pressing down any combination of the dial buttons 26c. In other words, the nonvolatile memory of the operating-side portable telephone may store tone signals corresponding to the buttons of "0" to "9", "*" and "#" so that the tone signals stored in the nonvolatile memory can be reproduced in any combination, for example. In this case, the control portion may be formed to reproduce the "imaging tone signal" or the "preview tone signal" by combining any of the tone signals stored in the nonvolatile memory of the operating-side portable telephone on the basis of an operation of the user employing the selection button while establishing the telephone call state between the operating-side portable telephone and the camera-side portable telephone, thereby transmitting the tone signal ("the imaging tone signal" or the "preview tone signal") to the camera-side portable telephone.

What is claimed is:

1. A portable telephone comprising:
an imaging portion;
a first communication portion for telephone communication;
a control portion controlling said imaging portion to execute an imaging operation on the basis of a prescribed first operation of an operating-side portable telephone for operating said imaging portion while establishing a telephone call state by making a telephone call to said operating-side portable telephone with said first communication portion so that said operating-side portable telephone takes said telephone call; and
a second communication portion formed to be capable of communicating with said operating-side portable telephone by a method other than telephone communication and capable of acquiring identification information belonging to said operating-side portable telephone, wherein
said control portion is formed to control said first communication portion to make said telephone call to said operating-side portable telephone based on said identification information previously acquired by said second communication portion when making said telephone call to said operating-side portable telephone,
said portable telephone is formed to be switchable between a first operation mode for making telephone communication with said operating-side portable telephone and a second operation mode for allowing said imaging portion to execute said imaging operation based on said prescribed first operation of said operating-side portable telephone, and
said control portion is formed to control said second communication portion to acquire said identification information of said operating-side portable telephone when a user sets said portable telephone to said second operation mode.

2. The portable telephone according to claim 1, wherein said control portion is formed to control said first communication portion to make said telephone call to said operating-side portable telephone on the basis of an operation of a user.

3. The portable telephone according to claim 2, formed to be switchable between a first operation mode for making ordinary telephone communication with said operating-side portable telephone and a second operation mode for allowing said imaging portion to execute said imaging operation on the basis of said prescribed first operation of said operating-side portable telephone, wherein
said control portion is formed to control said first communication portion to make said telephone call to said operating-side portable telephone when said user sets said portable telephone to said second operation mode.

4. The portable telephone according to claim 1, wherein
said prescribed first operation of said operating-side portable telephone includes an operation of a user cutting off said telephone call state, and
said control portion is formed to control said imaging portion to execute said imaging operation on the basis of said operation of said user cutting off a communication state in said telephone call state from the side of said operating-side portable telephone.

5. The portable telephone according to claim 4, wherein
said operating-side portable telephone is formed to transmit a signal for terminating said communication state in said telephone call state when said user cuts off said communication state, and
said control portion is formed to control said imaging portion to execute said imaging operation by detecting that said user has cut off said communication state in said telephone call state when said first communication portion receives said signal for terminating said communication state.

6. The portable telephone according to claim 1, wherein
said control portion is formed to control said second communication portion to previously acquire said identification information belonging to said operating-side portable telephone by using at least one type of communication system, and
said control portion is formed to control said second communication portion to acquire said identification information by using a second communication system different from a first communication system when said identification information has been unacquirable through said first communication system.

7. The portable telephone according to claim 1, so formed that a user can select or input identification information of said operating-side portable telephone, wherein
said control portion is formed to control said first communication portion to make said telephone call on the basis of said identification information selected or input by said user when making said telephone call to said operating-side portable telephone.

8. The portable telephone according to claim 1, wherein
said prescribed first operation of said operating-side portable telephone includes an operation of a user transmitting at least either a first voice signal or a first tone signal from said operating-side portable telephone, and
said control portion is formed to control said imaging portion to execute said imaging operation on the basis of at least either said first voice signal or said first tone signal from said operating-side portable telephone while establishing said telephone call state between said portable telephone and said operating-side portable telephone.

9. The portable telephone according to claim 8, further comprising a storage portion storing at least either said first voice signal or said first tone signal, wherein
said control portion is formed to control said imaging portion to execute said imaging operation when at least a voice signal or a tone signal from said operating-side portable telephone coincides with at least either said first voice signal or said first tone signal stored in said storage portion.

10. The portable telephone according to claim 8, wherein said first voice signal is a signal related to a prescribed voice pattern or a prescribed volume.

11. The portable telephone according to claim 1, wherein said control portion is formed to control said imaging portion to acquire a preview image before executing said imaging operation on the basis of a second operation, different from said prescribed first operation, from said operating-side portable telephone and to transmit acquired said preview image to said operating-side portable telephone.

12. The portable telephone according to claim 11, wherein said control portion is formed to transmit said preview image acquired on the basis of said second operation to said operating-side portable telephone through said first communication portion performing telephone communication.

13. The portable telephone according to claim 12, wherein said control portion is formed to maintain said telephone call state between said portable telephone and said operating-side portable telephone after transmitting said preview image to said operating-side portable telephone.

14. The portable telephone according to claim 11, wherein said control portion is formed to control said imaging portion to acquire said preview image with a number of pixels smaller than a number of pixels for executing said imaging operation on the basis of said prescribed first operation when acquiring said preview image on the basis of said second operation and to transmit data of acquired said preview image to said operating-side portable telephone in a compressed state.

15. The portable telephone according to claim 11, wherein said prescribed first operation of said operating-side portable telephone includes an operation of a user transmitting at least either a first voice signal or a first tone signal from said operating-side portable telephone, and
said control portion is formed to receive information related to an imaging range specified by a user in said preview image from said operating-side portable telephone and to set an imaging range for executing said imaging operation on the basis of said prescribed first operation on the basis of said information related to said imaging range.

16. The portable telephone according to claim 11, wherein said second operation of said operating-side portable telephone includes an operation of a user transmitting at least either a second voice signal different from a first voice signal or a second tone signal different from a first tone signal from said operating-side portable telephone, and
said control portion is formed to control said imaging portion to acquire said preview image before executing said imaging operation on the basis of at least either said second voice signal or said second tone signal from said operating-side portable telephone and to transmit acquired said preview image to said operating-side portable telephone.

17. An imaging system employing portable telephones, comprising:
an operating-side portable telephone; and
an imaging-side portable telephone including an imaging portion, a first communication portion for telephone communication, a control portion controlling said imaging portion to execute an imaging operation on the basis of a prescribed operation of said operating-side portable telephone for operating said imaging portion while establishing a telephone call state by making a telephone call to said operating-side portable telephone with said communication portion so that said operating-side portable telephone takes said telephone call, and a second communication portion formed to be capable of communicating with said operating-side portable telephone by a method other than telephone communication and capable of acquiring identification information belonging to said operating-side portable telephone, wherein
said control portion is formed to control said first communication portion to make said telephone call to said operating-side portable telephone based on said identification information previously acquired by said second communication portion when making said telephone call to said operating-side portable telephone,
said imaging-side portable telephone is formed to be switchable between a first operation mode for making telephone communication with said operating-side portable telephone and a second operation mode for allowing said imaging portion to execute said imaging operation based on said prescribed first operation of said operating-side portable telephone, and
said control portion is formed to control said second communication portion to acquire said identification information of said operating-side portable telephone when a user sets said imaging-side portable telephone to said second operation mode.

18. An imaging method comprising the steps of:
establishing a telephone call state by making a telephone call from an imaging-side portable telephone including a first communication portion for telephone communication, an imaging portion to an operating-side portable telephone for operating said imaging portion so that said operating-side portable telephone takes said telephone call, a control portion, and a second communication portion formed to be capable of communicating with said operating-side portable telephone by a method other than telephone communication and capable of acquiring identification information belonging to said operating-side portable telephone;
executing, by the control portion, an imaging operation of said imaging portion on the basis of a prescribed operation of a user on said operating-side portable telephone in the state where said telephone call state is established between said imaging-side portable telephone and said operating-side portable telephone, wherein
said control portion is formed to control said first communication portion to make said telephone call to said operating-side portable telephone based on said identification information previously acquired by said second communication portion when making said telephone call to said operating-side portable telephone,
said imaging-side portable telephone is formed to be switchable between a first operation mode for making telephone communication with said operating-side portable telephone and a second operation mode for allowing said imaging portion to execute said imaging operation based on said prescribed first operation of said operating-side portable telephone, and
said control portion is formed to control said second communication portion to acquire said identification information of said operating-side portable telephone when a user sets said imaging-side portable telephone to said second operation mode.

* * * * *